(12) United States Patent
Jackson

(10) Patent No.: US 7,454,427 B2
(45) Date of Patent: Nov. 18, 2008

(54) AUTONOMIC CONTROL OF A DISTRIBUTED COMPUTING SYSTEM USING RULE-BASED SENSOR DEFINITIONS

(75) Inventor: Jerry R. Jackson, Colorado Springs, CO (US)

(73) Assignee: Cassatt Corporation, San Jose, CA (US)

( * ) Notice: Subject to any disclaimer, the term of this patent is extended or adjusted under 35 U.S.C. 154(b) by 266 days.

(21) Appl. No.: 11/176,161

(22) Filed: Jul. 7, 2005

(65) Prior Publication Data
US 2006/0173857 A1    Aug. 3, 2006

Related U.S. Application Data

(63) Continuation-in-part of application No. 11/074,291, filed on Mar. 7, 2005, which is a continuation-in-part of application No. 11/047,468, filed on Jan. 31, 2005.

(51) Int. Cl.
*H04L 9/32* (2006.01)
(52) U.S. Cl. .......................................... 707/10; 713/201
(58) Field of Classification Search .................. 707/10; 713/201; 455/445
See application file for complete search history.

(56) References Cited

U.S. PATENT DOCUMENTS

| | | | |
|---|---|---|---|
| 5,049,873 | A | 9/1991 | Robins et al. |
| 5,715,396 | A | 2/1998 | Chatwani et al. |
| 5,751,967 | A | 5/1998 | Raab et al. |
| 5,774,377 | A | 6/1998 | Eidson et al. |
| 5,956,515 | A | 9/1999 | Beals et al. |
| 6,202,091 | B1 | 3/2001 | Godse |
| 6,226,788 | B1 | 5/2001 | Schoening et al. |
| 6,259,448 | B1 | 7/2001 | McNally et al. |
| 6,430,622 | B1 | 8/2002 | Aiken et al. |

(Continued)

FOREIGN PATENT DOCUMENTS

WO    WO/03/085526 A1    10/2003

OTHER PUBLICATIONS

Notification of Transmittal of the International Search Report and the Written Opinion of the International Searching Authority for corresponding patent application No. PCT/US2006/003439, mailed Jul. 18, 2006, 14 pages.

(Continued)

*Primary Examiner*—Pierre M. Vital
*Assistant Examiner*—Truong V Vo
(74) *Attorney, Agent, or Firm*—Shumaker & Sieffert, P.A.

(57) ABSTRACT

A distributed computing system conforms to a multi-level, hierarchical organizational model. One or more control nodes provide for the efficient and automated allocation and management of computing functions and resources within the distributed computing system in accordance with the organization model. A user, such as a system administrator, interacts with the control nodes to logically define the hierarchical organization of distributed computing system. The control node includes an automation subsystem having one or more rule engines that provide autonomic control of the application nodes in accordance with a set of one or more rules. For example, the rules may define sensors or methods of configuring the distributed computing system. More specifically, the sensor rules define the conditions under which the automation subsystem may update a model of the distributed computing system based on data received from the distributed computing system.

25 Claims, 22 Drawing Sheets

U.S. PATENT DOCUMENTS

| | | | |
|---|---|---|---|
| 6,532,465 B2 * | 3/2003 | Hartley et al. | 707/10 |
| 6,535,915 B1 | 3/2003 | Valys et al. | |
| 6,535,977 B1 | 3/2003 | Holle et al. | |
| 6,711,613 B1 | 3/2004 | Ewing et al. | |
| 6,775,829 B1 | 8/2004 | Kroening | |
| 6,847,993 B1 | 1/2005 | Novaes et al. | |
| 6,865,737 B1 | 3/2005 | Lucas et al. | |
| 6,920,493 B1 * | 7/2005 | Schwab | 709/223 |
| 7,055,040 B2 | 5/2006 | Klemba et al. | |
| 7,203,731 B1 | 4/2007 | Coates et al. | |
| 2002/0156877 A1 | 10/2002 | Lu et al. | |
| 2002/0161751 A1 | 10/2002 | Mulgund et al. | |
| 2003/0051020 A1 | 3/2003 | Kadam et al. | |
| 2003/0061344 A1 | 3/2003 | Monroe | |
| 2003/0084156 A1 | 5/2003 | Graupner et al. | |
| 2003/0097438 A1 | 5/2003 | Bearden et al. | |
| 2003/0120780 A1 | 6/2003 | Zhu et al. | |
| 2003/0126265 A1 | 7/2003 | Aziz et al. | |
| 2003/0131078 A1 | 7/2003 | Scheer et al. | |
| 2003/0140282 A1 | 7/2003 | Kaler et al. | |
| 2003/0177176 A1 | 9/2003 | Hirschfeld et al. | |
| 2003/0195957 A1 | 10/2003 | Banginwar | |
| 2003/0229792 A1 | 12/2003 | Baldwin et al. | |
| 2004/0088694 A1 | 5/2004 | Ho | |
| 2004/0103193 A1 | 5/2004 | Pandya et al. | |
| 2004/0123141 A1 * | 6/2004 | Yadav | 713/201 |
| 2004/0162741 A1 | 8/2004 | Flaxer et al. | |
| 2004/0181794 A1 | 9/2004 | Coleman et al. | |
| 2004/0187104 A1 | 9/2004 | Sardesai et al. | |
| 2004/0201611 A1 | 10/2004 | Bagsby | |
| 2004/0253956 A1 * | 12/2004 | Collins | 455/445 |
| 2004/0260734 A1 | 12/2004 | Ren et al. | |
| 2005/0005200 A1 * | 1/2005 | Matena et al. | 714/38 |
| 2005/0027831 A1 | 2/2005 | Anderson et al. | |
| 2005/0091227 A1 | 4/2005 | McCollum et al. | |
| 2005/0091348 A1 | 4/2005 | Ferri et al. | |
| 2005/0193265 A1 | 9/2005 | Lin et al. | |
| 2006/0047789 A1 * | 3/2006 | Kumar et al. | 709/220 |
| 2006/0173856 A1 | 8/2006 | Jackson | |
| 2006/0173895 A1 | 8/2006 | Engquist et al. | |
| 2006/0173984 A1 | 8/2006 | Emeis et al. | |
| 2006/0173994 A1 | 8/2006 | Emeis et al. | |
| 2006/0200494 A1 | 9/2006 | Sparks | |

OTHER PUBLICATIONS

"Automated Discovery And Inventory Of Nodes Within An Autonomic Distributed Computing System," U.S. Appl. No. 11/070,851, filed Mar. 2, 2005.

Notification of Transmittal of the International Search Report and Written Opinion, from corresponding PCT Application Serial No. PCT/US2006/003448, mailed Jul. 18, 2006, 13 pages.

"Management Of Software Images For Computing Nodes Of A Distributed Computing System," U.S. Appl. No. 11/046,133, filed Jan. 28, 2005.

"Updating Software Images Associated With A Disributed Computing System," U.S. Appl. No. 11/046,152, filed Jan. 28, 2005.

E.N. Herness et al., "WebSphere Application Server: A Foundation for on Demand Computing," IBM Systems Journal IBM, vol. 43, No. 2, pp. 213-237, 2004.

Notification of Transmittal of the International Search Report and Written Opinion, from corresponding PCT Application Serial No. PCT/US2006/003436, mailed Jul. 18, 2006, 14 pages.

Notification of Transmittal of the International Search Report and Written Opinion, from corresponding PCT Application Serial No. PCT/US2006/003437, mailed Jul. 20, 2006, 13 pages.

Notification of Transmittal of the International Search Report and Written Opinion, from corresponding PCT Application Serial No. PCT/US2006/003028, mailed Jul. 18, 2006, 14 pages.

B. Urgaonkar et al., "Resource Overbooking and Application Profiling in Shared Hosting Platforms," Proceedings of the 5th Symposium on Operating Systems Design and Implementation, pp. 239-254, 2002.

G. Lodi et al., "QoS-aware Clustering of Application Servers," Proceedings of the 1st IEEE Workshop on Quality of Service for Application Servers, In Conjunction With the 23rd International Symposium on Reliable Distributed Systems, 3 pages, Oct. 17, 2004.

International Preliminary Report on Patentability from corresponding PCT Application Serial No. PCT/US2006/003439 mailed Aug. 9, 2007 (9 pages).

Office Action dated Sep. 14, 2007 for U.S. Appl. No. 11/070,851 (22 pages).

*Preinstalling Microsoft Windows XP by Using the OEM Preinstallation Kit. Part 1*. XP-002301441, Apr. 4, 2003, 24 pages.

R. Mark Koan et al., *It Takes a Village to Build an Image*, XP-002384269, 2003, pp. 200-207.

Office Action dated Oct. 4, 2007 for U.S. Appl. No. 11/046,133, (19 pages).

Office Action dated Oct. 2, 2007 for U.S. Appl. No. 11/191,882, (27 pages).

Office Action dated Jan. 2, 2008 for U.S. Appl. No. 11/191,384, (30 pages).

Brown et al., "Cisco Cookbook", Jul. 1, 2003, O'Reilly & Associates, Inc., First edition, Safari Books Online, http://proquest.safaribooksonline.com/print?xmlid=0596003676/ciscockbk-PREFACE-1 (12 pages).

Office Action dated Mar. 24, 2008, for U.S. Appl. No. 11/070,851, (28 pages).

Office Action dated Apr. 7, 2008, for U.S. Appl. No. 11/046,152, (25 pages).

Office Action dated Apr. 18, 2008, for U.S. Appl. No. 11/047,468 (21 pages).

Office Action dated Apr. 18, 2008, for U.S. Appl. No. 11/074,291, (33 pages).

Office Action dated May 1, 2008, for U.S. Appl. No. 11/191,882, (33 pages).

Office Action dated May 2, 2008, for U.S. Appl. No. 11/046,133, (24 pages).

* cited by examiner

```
// Connect a sensor to any node connector that is transitioning from
// offline to online or from online to offline. Also, monitor a
// node connector that has not been contacted so we can determine if
// it was running when we started.
sensor nodeStateSensor {
    NodeGoal goal;
    NodeConnectorIVO connector where .uid == goal#connectorUid;
    test ((goal#targetState > NODE_ENABLED &&
        goal#state >= NODE_ENABLED) ||
            (goal#targetState < NODE_STARTED &&
        goal#state > NODE_ENABLED) || goal#hasInteracted == false);
} --> {
    update connector#state when "NodeOnlineStatus" changed;
}

// Monitor any numeric parameter defined via JMX for an application. Average
// the values taking samples at a specified frequency and averaging over
// a specified period.
sensor applicationParameterSensor {
    ApplicationData app;
    TierIVO tier where .uid == app.tierUid;
    NodeConnectorIVO nc where .uid in tier.nodeConnectorUids;
    NodeStatus status
        where .nodeConnectorUid == nc.uid && .value == @NodeStatus.ONLINE;
    Parameter p where #objectUid == app.uid;
} --> {
    update p#value with
        average(sensorValue(@Sensors.JMX, p.name, nc.ipAddress)
        p.period, p.freq);
}

// Update the load average for a node connector when its value changes.
sensor loadAverageSensor {
    NodeConnectorIVO nc where .uid in tier.nodeConnectorUids;
    NodeStatus status
        where .nodeConnectorUid == nc.uid && .value == @NodeStatus.ONLINE;
} --> {
    update nc#loadAverage with
        sensorValue(@Sensors.SNMP, "LoadAverage", nc.ipAddress)
        when changed;
}
```

FIG. 22

AUTONOMIC CONTROL OF A DISTRIBUTED COMPUTING SYSTEM USING RULE-BASED SENSOR DEFINITIONS

The application is a continuation-in part of and claims priority to Ser. No. 11/074,291, filed Mar. 7, 2005, which is a continuation-in part of and claims priority to Ser. No. 11/047,468, filed Jan. 31, 2005, the entire content of each of which is incorporated herein by reference.

TECHNICAL FIELD

The invention relates to computing environments and, more specifically, to distributed computing systems.

BACKGROUND

Distributed computing systems are increasingly being utilized to support business as well as technical applications. Typically, distributed computing systems are constructed from a collection of computing nodes that combine to provide a set of processing services to implement the distributed computing applications. Each of the computing nodes in the distributed computing system is typically a separate, independent computing device interconnected with each of the other computing nodes via a communications medium, e.g., a network.

One challenge with distributed computing systems is the organization, deployment and administration of such a system within an enterprise environment. For example, it is often difficult to manage the allocation and deployment of enterprise computing functions within the distributed computing system. An enterprise, for example, often includes several business groups, and each group may have competing and variable computing requirements.

SUMMARY

In general, the invention is directed to a distributed computing system that conforms to a multi-level, hierarchical organizational model. One or more control nodes provide for the efficient and automated allocation and management of computing functions and resources within the distributed computing system in accordance with the organization model.

As described herein, the model includes four distinct levels: fabric, domains, tiers and nodes that provide for the logical abstraction and containment of the physical components as well as system and service application software of the enterprise. A user, such as a system administrator, interacts with the control nodes to logically define the hierarchical organization of the distributed computing system. The control nodes are responsible for all levels of management in accordance with the model, including fabric management, domain creation, tier creation and node allocation and deployment.

In one embodiment, a distributed computing system comprises a plurality of application nodes interconnected via a communications network, and a control node. The control node includes an automation subsystem having one or more rule engines that provide autonomic control of the application nodes in accordance with a set of one or more rules. These rules define preconditions under which the automation system may take the action specified by the rule. For example, the rules may define sensors or methods of configuring the distributed computing system. More specifically, the sensor rules define the conditions under which the automation subsystem may update a model of the distributed computing system based on data received from the distributed computing system.

In another embodiment, a method comprises receiving input that defines an expected state for a distributed computing system having a plurality of application nodes interconnected via a communications network, and receiving status data that represents an actual state for the distributed computing system. The method further comprises processing rules with a set of rule engines. The rules define sensor rules and configuration rules. The sensor rules determine operations for updating a model of the actual state of the nodes. The configuration rules determine operations for reducing any difference between the actual state and the expected state, and applying the operations to the distributed computing system to control the application nodes in accordance with the rules.

In another embodiment, a computer-readable medium comprises instructions that cause a processor to process rules with a set of forward-chaining rule engines. These rules may either be sensor rules or configuration rules. The sensor rules define the conditions under which the processor should listen for a certain data pattern, and how to modify a model of the actual state of the distributed computing system when that data pattern occurs. The configuration rules determine operations for reducing differences between the model of the actual state of a distributed computing system and an expected state. The instructions further cause the computer to apply the operations to the distributed computing system to provide autonomic control of the application nodes in accordance with the rules.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 8 is a screen illustration of an exemplary user interface for defining properties of the tiers.

FIG. 9 is a screen illustration of an exemplary user interface for viewing and identify properties of a computing node.

FIG. 22 is a screen illustration of an exemplary user interface for editing sensor and configuration rules.

DETAILED DESCRIPTION

Figure 1:
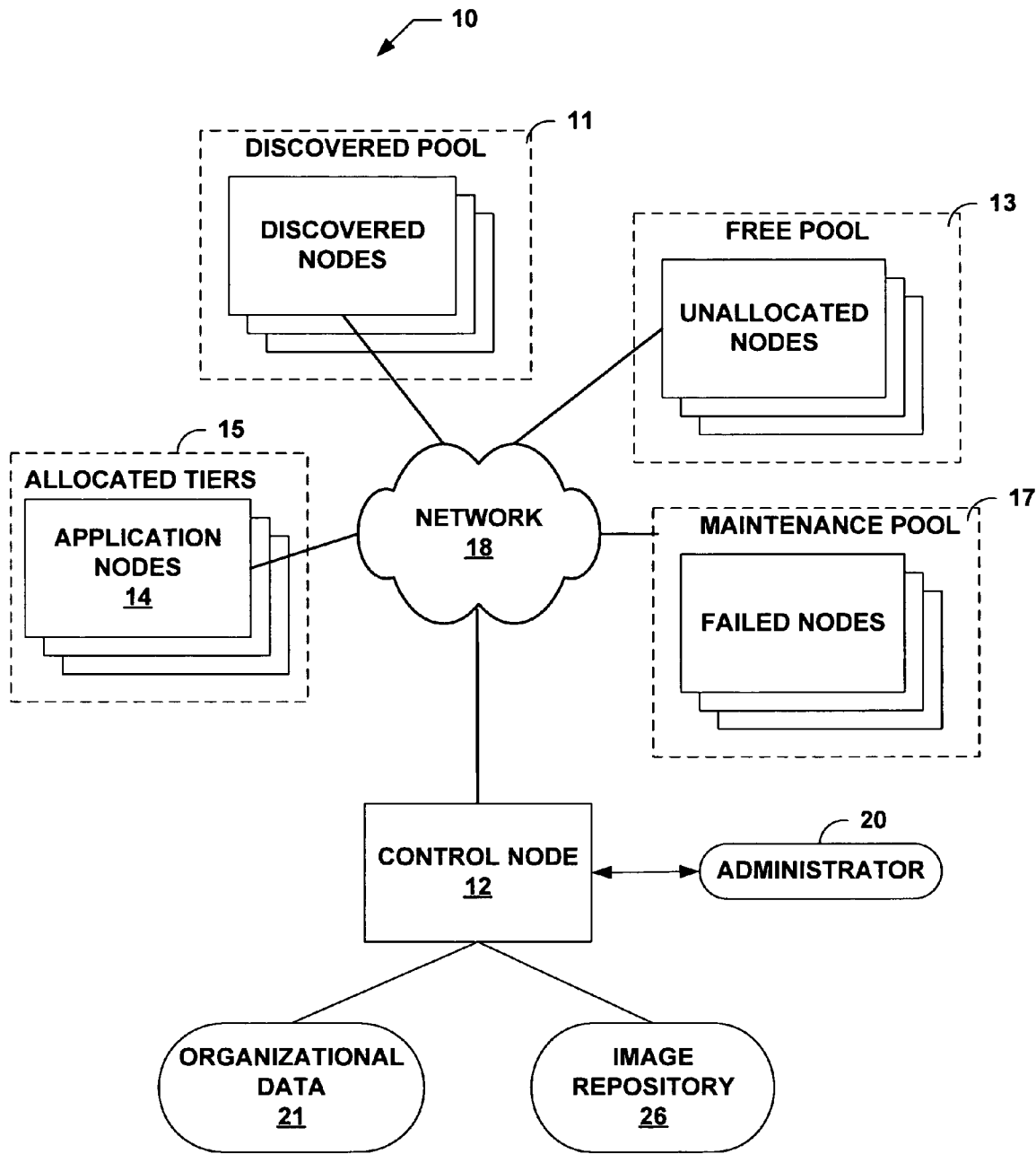
FIG. 1 is a block diagram illustrating a distributed computing system constructed from a collection of computing nodes.

FIG. 1 is a block diagram illustrating a distributed computing system 10 constructed from a collection of computing nodes. Distributed computing system 10 may be viewed as a collection of computing nodes operating in cooperation with each other to provide distributed processing.

In the illustrated example, the collection of computing nodes forming distributed computing system 10 are logically grouped within a discovered pool 11, a free pool 13, an allocated tiers 15 and a maintenance pool 17. In addition, distributed computing system 10 includes at least one control node 12.

Within distributed computing system 10, a computing node refers to the physical computing device. The number of computing nodes needed within distributed computing system 10 is dependent on the processing requirements. For example, distributed computing system 10 may include 8 to 512 computing nodes or more. Each computing node includes one or more programmable processors for executing software instructions stored on one or more computer-readable media.

Discovered pool 11 includes a set of discovered nodes that have been automatically "discovered" within distributed computing system 10 by control node 12. For example, control node 12 may monitor dynamic host communication protocol (DHCP) leases to discover the connection of a node to network 18. Once detected, control node 12 automatically inventories the attributes for the discovered node and reassigns the discovered node to free pool 13. The node attributes identified during the inventory process may include a CPU count, a CPU speed, an amount of memory (e.g., RAM), local disk characteristics or other computing resources. Control node 12 may also receive input identifying node attributes not detectable via the automatic inventory, such as whether the node includes I/O, such as HBA. Further details with respect to the automated discovery and inventory processes are described in U.S. patent application Ser. No. 11/070,851, having, entitled "AUTOMATED DISCOVERY AND INVENTORY OF NODES WITHIN AN AUTONOMIC DISTRIBUTED COMPUTING SYSTEM," filed Mar. 2, 2005, the entire content of which is hereby incorporated by reference.

Free pool 13 includes a set of unallocated nodes that are available for use within distributed computing system 10. Control node 12 may dynamically reallocate an unallocated node from free pool 13 to allocated tiers 15 as an application node 14. For example, control node 12 may use unallocated nodes from free pool 13 to replace a failed application node 14 or to add an application node to allocated tiers 15 to increase processing capacity of distributed computing system 10.

In general, allocated tiers 15 include one or more tiers of application nodes 14 that are currently providing a computing environment for execution of user software applications. In addition, although not illustrated separately, application nodes 14 may include one or more input/output (I/O) nodes. Application nodes 14 typically have more substantial I/O capabilities than control node 12, and are typically configured with more computing resources (e.g., processors and memory). Maintenance pool 17 includes a set of nodes that either could not be inventoried or that failed and have been taken out of service from allocated tiers 15.

Control node 12 provides the system support functions for managing distributed computing system 10. More specifically, control node 12 manages the roles of each computing node within distributed computing system 10 and the execution of software applications within the distributed computing system. In general, distributed computing system 10 includes at least one control node 12, but may utilize additional control nodes to assist with the management functions.

Other control nodes 12 (not shown in FIG. 1) are optional and may be associated with a different subset of the computing nodes within distributed computing system 10. Moreover, control node 12 may be replicated to provide primary and backup administration functions, thereby allowing for graceful handling a failover in the event control node 12 fails.

Network 18 provides a communications interconnect for control node 12 and application nodes 14, as well as discovered nodes, unallocated nodes and failed nodes. Communications network 18 permits internode communications among the computing nodes as the nodes perform interrelated operations and functions. Communications network 18 may comprise, for example, direct connections between one or more of the computing nodes, one or more customer networks maintained by an enterprise, local area networks (LANs), wide area networks (WANs) or a combination thereof. Communications network 18 may include a number of switches, routers, firewalls, load balancers, and the like.

In one embodiment, each of the computing nodes within distributed computing system 10 executes a common general-purpose operating system. One example of a general-purpose operating system is the Windows™ operating system provided by Microsoft Corporation. In some embodiments, the general-purpose operating system such as the Linux kernel may be used.

In the example of FIG. 1, control node 12 is responsible for software image management. The term "software image" refers to a complete set of software loaded on an individual computing node, including the operating system and all boot code, middleware and application files. System administrator 20 may interact with control node 12 and identify the particular types of software images to be associated with application nodes 14. Alternatively, administration software executing on control node 12 may automatically identify the appropriate software images to be deployed to application nodes 14 based on the input received from system administrator 20. For example, control node 12 may determine the type of software image to load onto an application node 14 based on the functions assigned to the node by system administrator 20. Application nodes 14 may be divided into a number of groups based on their assigned functionality. As one example, application nodes may be divided into a first group to provide web server functions, a second group to provide business application functions and a third group to provide database functions. The application nodes 14 of each group may be associated with different software images.

Control node 12 provides for the efficient allocation and management of the various software images within distributed computing system 10. In some embodiments, control node 12 generates a "golden image" for each type of software image that may be deployed on one or more of application nodes 14. As described herein, the term "golden image" refers to a reference copy of a complete software stack.

System administrator 20 may create a golden image by installing an operating system, middleware and software applications on a computing node and then making a complete copy of the installed software. In this manner, a golden image may be viewed as a "master copy" of the software image for a particular computing function. Control node 12 maintains a software image repository 26 that stores the golden images associated with distributed computing system 10.

Control node 12 may create a copy of a golden image, referred to as an "image instance," for each possible image instance that may be deployed within distributed computing system 10 for a similar computing function. In other words, control node 12 pregenerates a set of K image instances for a golden image, where K represents the maximum number of image instances for which distributed computing system 10 is configured for the particular type of computing function. For a given computing function, control node 12 may create the complete set of image instance even if not all of the image instances will be initially deployed. Control node 12 creates different sets of image instances for different computing functions, and each set may have a different number of image instances depending on the maximum number of image instances that may be deployed for each set. Control node 12 stores the image instances within software image repository 26. Each image instance represents a collection of bits that may be deployed on an application node.

Further details of software image management are described in co-pending U.S. patent application Ser. No. 11/046,133, entitled "MANAGEMENT OF SOFTWARE IMAGES FOR COMPUTING NODES OF A DISTRIBUTED COMPUTING SYSTEM," filed Jan. 28, 2005 and co-pending U.S. patent application Ser. No. 11/046,152, entitled "UPDATING SOFTWARE IMAGES ASSOCIATED WITH A DISTRIBUTED COMPUTING SYSTEM," filed Jan. 28, 2005, each of which is incorporated herein by reference in its entirety.

In general, distributed computing system 10 conforms to a multi-level, hierarchical organizational model that includes four distinct levels: fabric, domains, tiers and nodes. Control node 12 is responsible for all levels of management, including fabric management, domain creation, tier creation and node allocation and deployment.

As used herein, the "fabric" level generally refers to the logical constructs that allow for definition, deployment, partitioning and management of distinct enterprise applications. In other words, fabric refers to the integrated set of hardware, system software and application software that can be "knitted" together to form a complete enterprise system. In general, the fabric level consists of two elements: fabric components or fabric payload. Control node 12 provides fabric management and fabric services as described herein.

In contrast, a "domain" is a logical abstraction for containment and management within the fabric. The domain provides a logical unit of fabric allocation that enables the fabric to be partitioned amongst multiple uses, e.g. different business services.

Domains are comprised of tiers, such as a 4-tier application model (web server, application server, business logic, persistence layer) or a single tier monolithic application. Fabric domains contain the free pool of devices available for assignment to tiers.

A tier is a logically associated group of fabric components within a domain that share a set of attributes: usage, availability model or business service mission. Tiers are used to define structure within a domain e.g. N-tier application, and each tier represents a different computing function. A user, such as administrator 20, typically defines the tier structure within a domain. The hierarchical architecture may provide a high degree of flexibility in mapping customer applications to logical models which run within the fabric environment. The tier is one construct in this modeling process and is the logical container of application resources.

The lowest level, the node level, includes the physical components of the fabric. This includes computing nodes that, as described above, provide operating environments for system applications and enterprise software applications. In addition, the node level may include network devices (e.g., Ethernet switches, load balancers and firewalls) used in creating the infrastructure of network 18. The node level may further include network storage nodes that are network connected to the fabric.

System administrator 20 accesses administration software executing on control node 12 to logically define the hierarchical organization of distributed computing system 10. For example, system administrator 20 may provide organizational data 21 to develop a model for the enterprise and logically define the enterprise fabric. System administrator 20 may, for instance, develop a model for the enterprise that includes a number of domains, tiers, and node slots hierarchically arranged within a single enterprise fabric.

More specifically, system administrator 20 defines one or more domains that each correspond to a single enterprise application or service, such as a customer relation management (CRM) service. System administrator 20 further defines one or more tiers within each domain that represent the functional subcomponents of applications and services provided by the domain. As an example, system administrator 20 may define a storefront domain within the enterprise fabric that includes a web tier, an application tier and a database tier. In this manner, distributed computing system 10 may be configured to automatically provide web server functions, business application functions and database functions.

For each of the tiers, control node 12 creates a number of "node slots" equal to the maximum number of application nodes 14 that may be deployed. In general, each node slot represents a data set that describes specific information for a corresponding node, such as software resources for a physical node that is assigned to the node slot. The node slots may, for instance, identify a particular software image instance associated with an application node 14 as well as a network address associated with that particular image instance.

In this manner, each of the tiers include one or more node slots that reference particular software image instances to boot on the application nodes 14 to which each software image instance is assigned. The application nodes 14 to which control node 12A assigns the image instances temporarily inherit the network address assigned to the image instance for as long as the image instance is deployed on that particular application node. If for some reason the image instance is moved to a different application node 14, control node 12A moves the network address to that new application node.

System administrator 20 may further define specific node requirements for each tier of the fabric. For example, the node requirements specified by system administrator 20 may include a central processing unit (CPU) count, a CPU speed, an amount of memory (e.g., RAM), local disk characteristics and other hardware characteristics that may be detected on the individual computing nodes. System administrator 20 may also specify user-defined hardware attributes of the computing nodes, such as whether I/O (like HBA) is required. The user-defined hardware attributes are typically not capable of detection during an automatic inventory. In this manner, system administrator 20 creates a list of attributes that the tier requires of its candidate computing nodes. In addition, particular node requirements may be defined for software image instances.

In addition to the node requirements described above, system administrator 20 may further define policies that are used when re-provisioning computing nodes within the fabric. System administrator 20 may define policies regarding tier characteristics, such as a minimum number of nodes a tier requires, an indication of whether or not a failed node is dynamically replaced by a node from free pool 13, a priority for each tier relative to other tiers, an indication of whether or not a tier allows nodes to be re-provisioned to other tiers to satisfy processing requirements by other tiers of a higher priority or other policies. Control node 12 uses the policy information input by system administrator 20 to re-provision computing nodes to meet tier processing capacity demands.

After receiving input from system administrator 20 defining the architecture and policy of the enterprise fabric, control node 12 identifies unallocated nodes within free pool 13 that satisfy required node attributes. Control node 12 automatically assigns unallocated nodes from free pool 13 to respective tier node slots of a tier. As will be described in detail herein, in one embodiment, control node 12 may assign computing nodes to the tiers in a "best fit" fashion. Particularly, control node 12 assigns computing nodes to the tier whose node attributes most closely match the node requirements of the tier as defined by administrator 20. The assignment of the computing nodes may occur on a tier-by-tier basis beginning with a tier with the highest priority and ending with a tier with the lowest priority. Alternatively, or in addition, assignment of computing nodes may be based on dependencies defined between tiers.

As will be described in detail below, control node 12 may automatically add unallocated nodes from free pool 13 to a tier when more processing capacity is needed within the tier, remove nodes from a tier to the free pool when the tier has excess capacity, transfer nodes from tier to tier to meet processing demands, or replace failed nodes with nodes from the free pool. Thus, computing resources, i.e., computing nodes, may be automatically shared between tiers and domains within the fabric based on user-defined policies to dynamically address high-processing demands, failures and other events.

Figure 2:
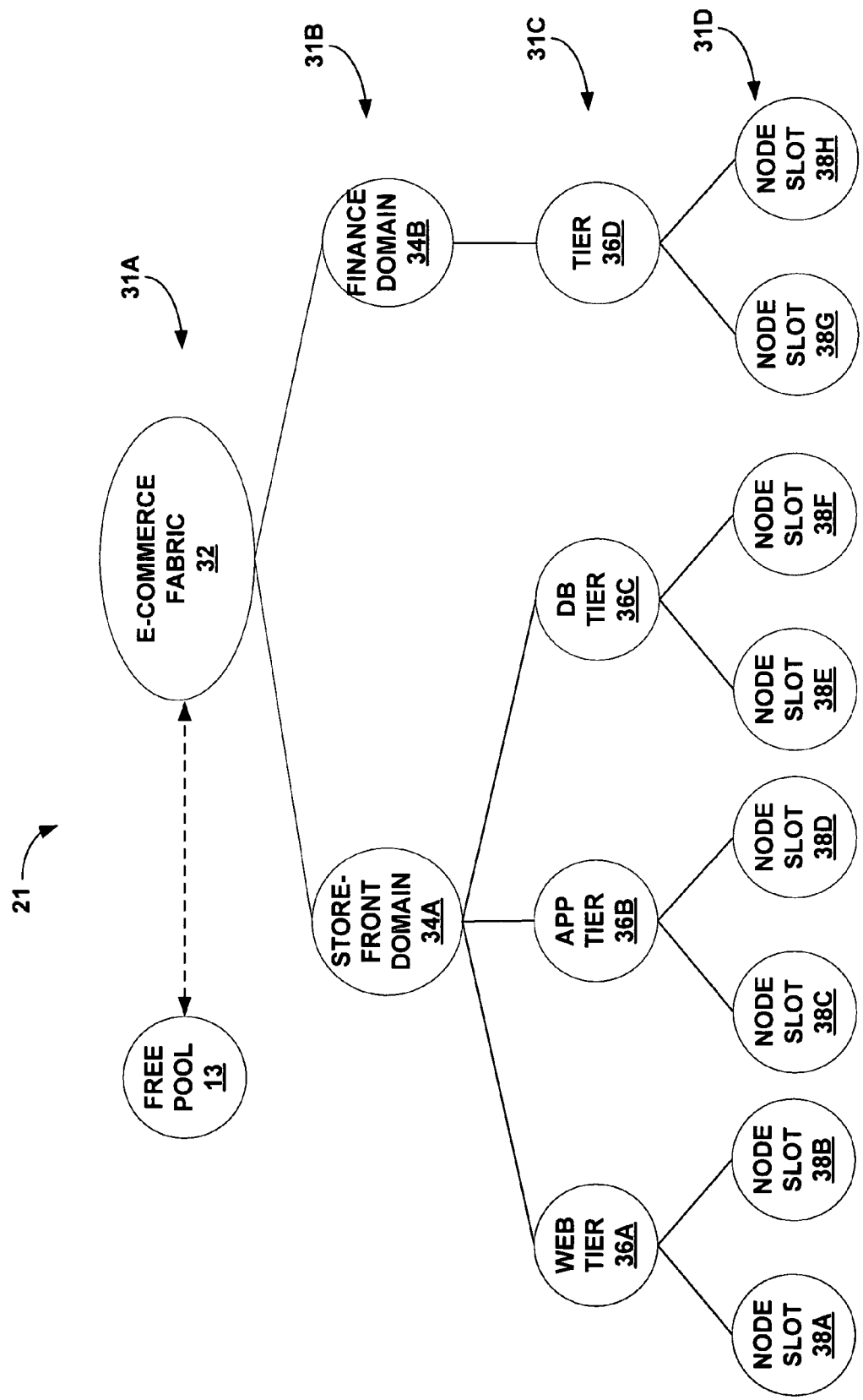
FIG. 2 is a schematic diagram illustrating an example of a model of an enterprise that logically defines an enterprise fabric.

FIG. 2 is a schematic diagram illustrating an example embodiment of organizational data 21 that defines a model logically representing an enterprise fabric in accordance with the invention. In the example illustrated in FIG. 2, control node 12 (FIG. 1) maintains organizational data 21 to define a simple e-commerce fabric 32.

In this example, e-commerce fabric 32 includes a storefront domain 34A and a financial planning domain 34B. Storefront domain 34A corresponds to the enterprise storefront domain and allows customers to find and purchase products over a network, such as the Internet. Financial planning domain 34B allows one or more employees to perform financial planning tasks for the enterprise.

Tier level 31C includes one or more tiers within each domain that represent the functional subcomponents of applications and services provided by the domain. For example, storefront domain 34A includes a web server tier (labeled "web tier") 36A, a business application tier (labeled "app tier") 36B, and a database tier (labeled "DB tier") 36C. Web server tier 36A, business application tier 36B and database tier 36C interact with one another to present a customer with an online storefront application and services. For example, the customer may interact with web server tier 36A via a web browser. When the customer searches for a product, web server tier 36A may interacts with business application tier 36B, which may in turn access a database tier 36C. Similarly, financial planning domain 34B includes a financial planning tier 36D that provides subcomponents of applications and services of the financial planning domain 34B. Thus, in this example, a domain may include a single tier.

Tier level 31D includes one or more logical node slots 38A-38H ("node slots 38") within each of the tiers. Each of node slots 38 include node specific information, such as software resources for an application node 14 that is assigned to a respective one of the node slots 38. Node slots 38 may, for instance, identify particular software image instances within image repository 26 and map the identified software image instances to respective application nodes 14. As an example, node slots 38A and 38B belonging to web server tier 36A may reference particular software image instances used to boot two application nodes 14 to provide web server functions. Similarly, the other node slots 38 may reference software image instances to provide business application functions, database functions, or financial application functions depending upon the tier to which the node slots are logically associated.

Although in the example of FIG. 2, there are two node slots 38 corresponding to each tier, the tiers may include any number of node slots depending on the processing capacity needed on the tier. Furthermore, not all of node slots 38 may be currently assigned to an application node 14. For example, node slot 28B may be associated with an inactive software image instance and, when needed, may be assigned to an application node 14 for deployment of the software image instance.

In this example, organizational data 21 associates free node pool 13 with the highest-level of the model, i.e., e-commerce fabric 32. As described above, control node 12 may automatically assign unallocated nodes from free node pool 13 to at least a portion of tier node slots 38 of tiers 36 as needed using the "best fit" algorithm described above or another algorithm. Additionally, control node 12 may also add nodes from free pool 13 to a tier when more processing capacity is needed within the tier, remove nodes from a tier to free pool 13 when a tier has excess capacity, transfer nodes from tier to tier to meet processing demands, and replace failed nodes with nodes from the free tier.

Although not illustrated, the model for the enterprise fabric may include multiple free node pools. For example, the model may associate free node pools with individual domains at the domain level or with individual tier levels. In this manner, administrator 20 may define policies for the model such that unallocated computing nodes of free node pools associated with domains or tiers may only be used within the domain or tier to which they are assigned. In this manner, a portion of the computing nodes may be shared between domains of the entire fabric while other computing nodes may be restricted to particular domains or tiers.

Figure 3:
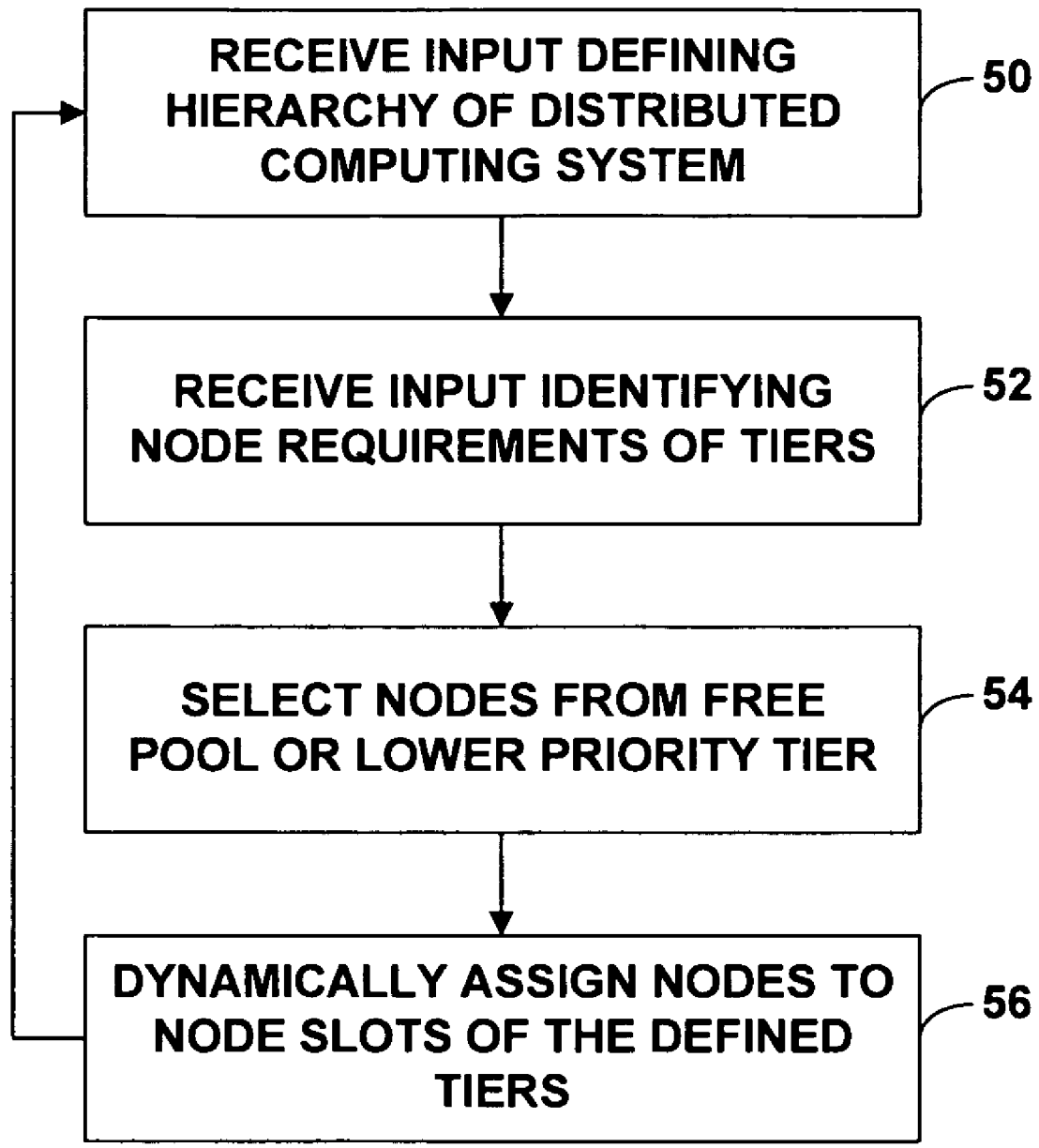
FIG. 3 is a flow diagram that provides a high-level overview of the operation of a control node when configuring the distributed computing system.

FIG. 3 is a flow diagram that provides a high-level overview of the operation of control node 12 when configuring distributed computing system 10. Initially, control node 12 receives input from a system administrator defining the hierarchical organization of distributed computing system 10 (50). In one example, control node 12 receives input that defines a model that specifies a number of hierarchically arranged nodes as described in detail in FIG. 2. Particularly, the defined architecture of distributed computing system 10 includes an overall fabric having a number of hierarchically arranged domains, tiers and node slots.

During this process, control node 12 may receive input specifying node requirements of each of the tiers of the hierarchical model (52). As described above, administrator 20 may specify a list of attributes, e.g., a central processing unit (CPU) count, a CPU speed, an amount of memory (e.g., RAM), or local disk characteristics, that the tiers require of their candidate computing nodes. In addition, control node 12 may further receive user-defined custom attributes, such as requiring the node to have I/O, such as HBA connectivity. The node requirements or attributes defined by system administrator 20 may each include a name used to identify the characteristic, a data type (e.g., integer, long, float or string), and a weight to define the importance of the requirement.

Control node 12 identifies the attributes for all candidate computing nodes within free pool 13 or a lower priority tier (54). As described above, control node 12 may have already discovered the computing nodes and inventoried the candidate computing nodes to identify hardware characteristics of all candidate computing nodes. Additionally, control node 12 may receive input from system administrator 20 identifying specialized capabilities of one or more computing nodes that are not detectable by the inventory process.

Control node 12 dynamically assigns computing nodes to the node slots of each tier based on the node requirements specified for the tiers and the identified node attributes (56). Population of the node slots of the tier may be performed on a tier-by-tier basis beginning with the tier with the highest priority, i.e., the tier with the highest weight assigned to it. As will be described in detail, in one embodiment, control node 12 may populate the node slots of the tiers with the computing nodes that have attributes that most closely match the node requirements of the particular tiers. Thus, the computing nodes may be assigned using a "best fit" algorithm.

Figure 4:
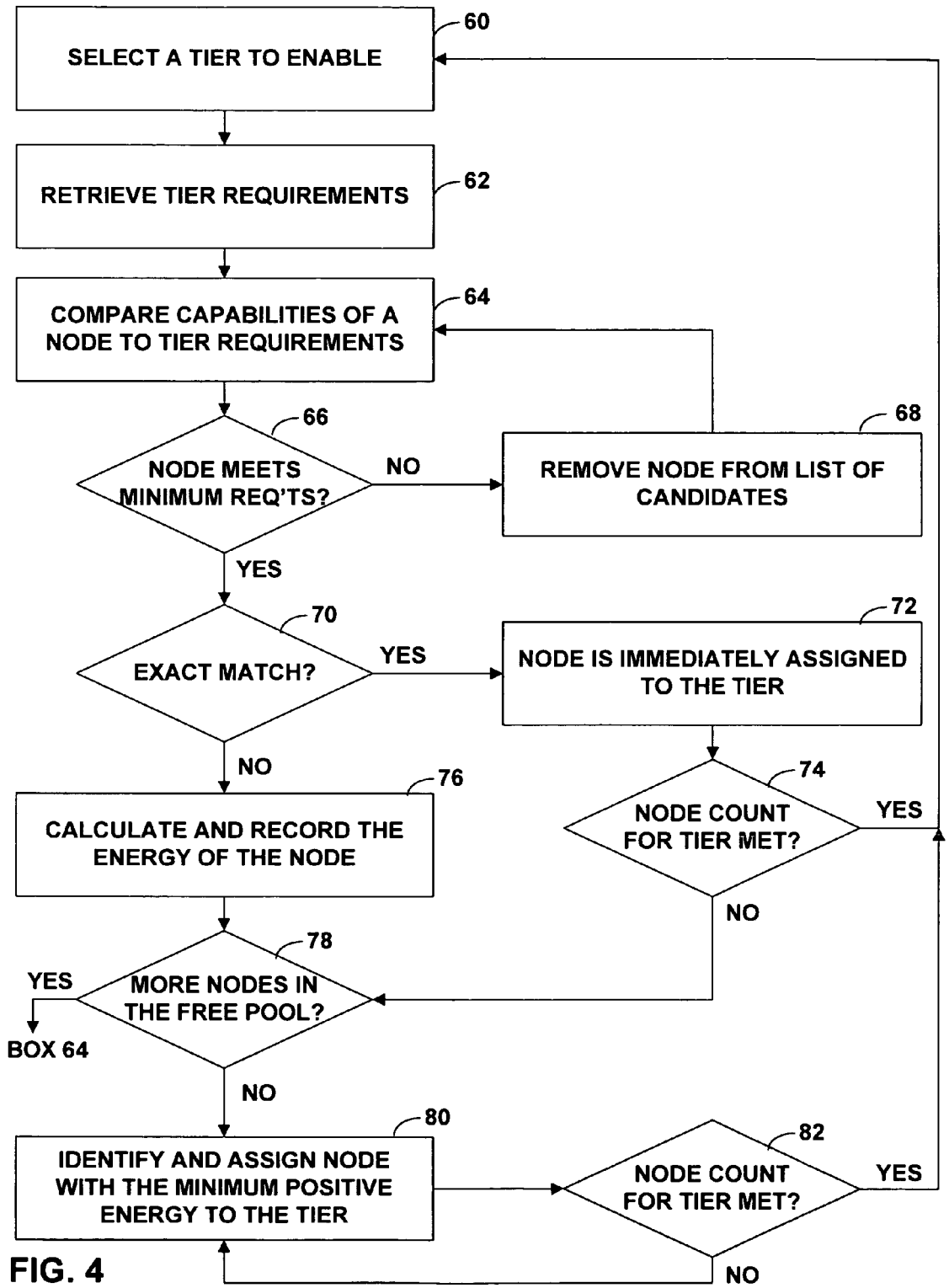
FIG. 4 is a flow diagram illustrating exemplary operation of the control node when assigning computing nodes to node slots of tiers.

FIG. 4 is a flow diagram illustrating exemplary operation of control node 12 when assigning computing nodes to node slots of tiers. Initially, control node 12 selects a tier to enable (60). As described above, control node 12 may select the tier based on a weight or priority assigned to the tier by administrator 20. Control node 12 may, for example, initially select the tier with the highest priority and successively enable the tiers based on priority.

Next, control node 12 retrieves the node requirements associated with the selected tier (62). Control node 12 may, for example, maintain a database having entries for each node slot, where the entries identify the node requirements for each of the tiers. Control node 12 retrieves the node requirements for the selected tier from the database.

In addition, control node 12 accesses the database and retrieves the computing node attributes of one of the unallocated computing nodes of free pool 13. Control node 12 compares the node requirements of the tier to the node attributes of the selected computing node (64).

Based on the comparison, control node 12 determines whether the node attributes of the computing node meets the minimum node requirements of the tier (66). If the node attributes of the selected computing node do not meet the minimum node requirements of the tier, then the computing node is removed from the list of candidate nodes for this particular tier (68). Control node 12 repeats the process by retrieving the node attributes of another of the computing nodes of the free pool and compares the node requirements of the tier to the node attributes of the computing node.

If the node attributes of the selected computing node meet the minimum node requirements of the tier (YES of 66), control node 12 determines whether the node attributes are an exact match to the node requirements of the tier (70). If the node attributes of the selected computing node and the node requirements of the tier are a perfect match (YES of 70), the computing node is immediately assigned from the free pool to a node slot of the tier and the image instance for the slot is associated with the computing node for deployment (72).

Control node 12 then determines whether the node count for the tier is met (74). Control node 12 may, for example, determine whether the tier is assigned the minimum number of nodes necessary to provide adequate processing capabilities. In another example, control node 12 may determine whether the tier is assigned the ideal number of nodes defined by system administrator 20. When the node count for the tier is met, control node 12 selects the next tier to enable, e.g., the tier with the next largest priority, and repeats the process until all defined tiers are enabled, i.e., populated with application nodes (60).

If the node attributes of the selected computing node and the node requirements of the tier are not a perfect match control node 12 calculates and records a "processing energy" of the node (76). As used herein, the term "processing energy" refers to a numerical representation of the difference between the node attributes of a selected node and the node requirements of the tier. A positive processing energy indicates the node attributes more than satisfy the node requirements of the tier. The magnitude of the processing energy represents the degree to which the node requirements exceed the tier requirements.

After computing and recording the processing energy of the nodes, control node 12 determines whether there are more candidate nodes in free pool 13 (78). If there are additional candidate nodes, control node 12 repeats the process by retrieving the computing node attributes of another one of the computing nodes of the free pool of computing nodes and comparing the node requirements of the tier to the node attributes of the computing node (64).

When all of the candidate computing nodes in the free pool have been examined, control node 12 selects the candidate computing node having the minimum positive processing energy and assigns the selected computing node to a node slot of the tier (80). Control node 12 determines whether the minimum node count for the tier is met (82). If the minimum node count for the tier has not been met, control node 12 assigns the computing node with the next lowest calculated processing energy to the tier (80). Control node 12 repeats this process until the node count is met. At this point, control node 12 selects the next tier to enable, e.g., the tier with the next largest priority (60).

In the event there are an insufficient number of computing nodes in free pool 13, or an insufficient number of computing nodes that meet the tier requirements, control node 12 notifies system administrator 20. System administrator 20 may add more nodes to free pool 13, add more capable nodes to the free pool, reduce the node requirements of the tier so more of the unallocated nodes meet the requirements, or reduce the configured minimum node counts for the tiers.

Figure 5:
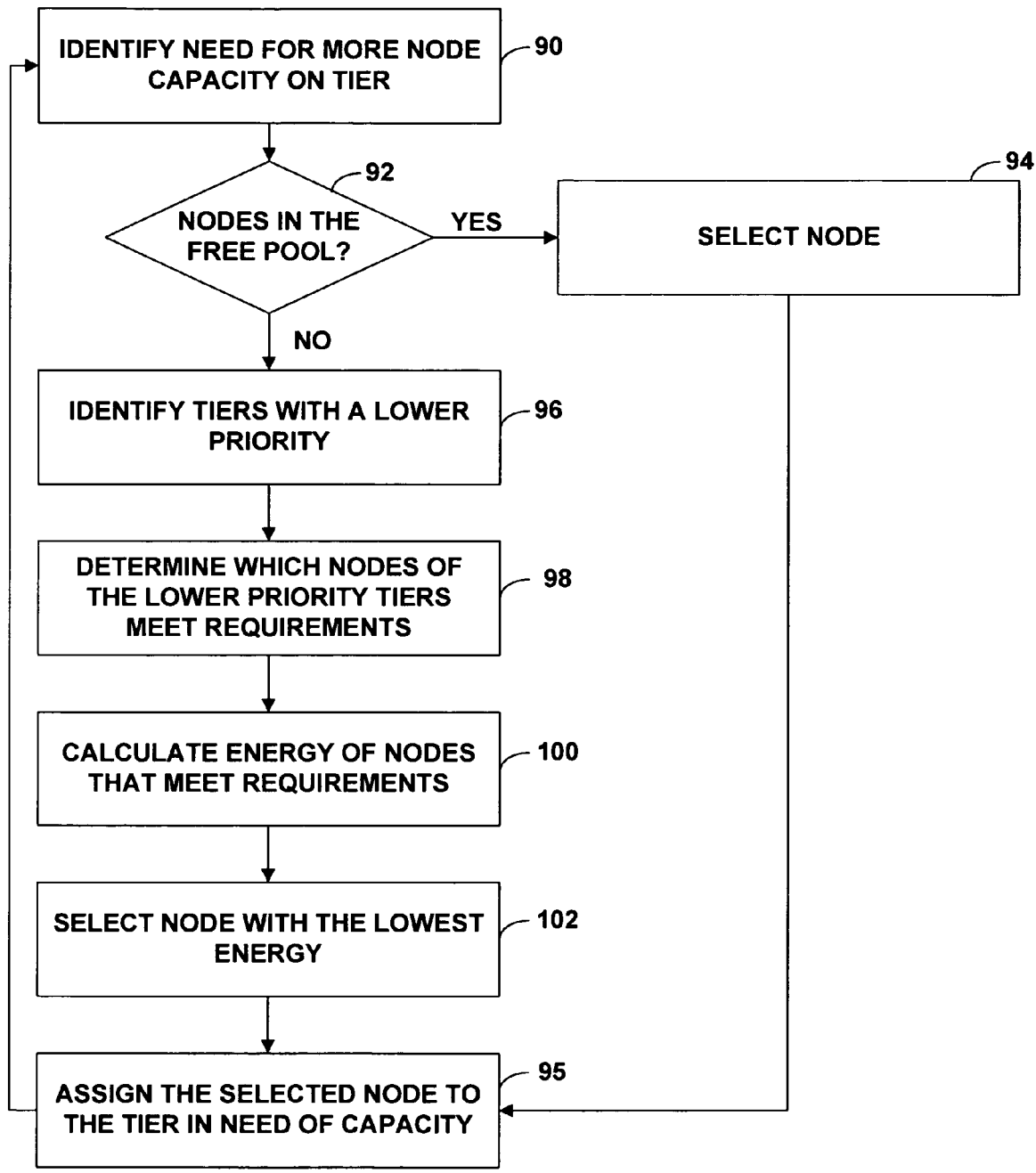
FIG. 5 is a flow diagram illustrating exemplary operation of a control node when adding an additional computing node to a tier to meet additional processing demands.

FIG. 5 is a flow diagram illustrating exemplary operation of control node 12 when adding an additional computing node to a tier to meet increased processing demands. Initially, control node 12 or system administrator 20 identifies a need for additional processing capacity on one of the tiers (90). Control node 12 may, for example, identify a high processing load on the tier or receive input from a system administrator identifying the need for additional processing capacity on the tier.

Control node 12 then determines whether there are any computing nodes in the free pool of nodes that meet the minimum node requirements of the tier (92). When there are one or more nodes that meet the minimum node requirements of the tier, control node 12 selects the node from the free pool based the node requirements of the tier, as described above, (94) and assigns the node to the tier (95). As described in detail with respect to FIG. 4, control node 12 may determine whether there are any nodes that have node attributes that are an exact match to the node requirements of the tier. If an exact match is found, the corresponding computing node is assigned to a node slot of the tier. If no exact match is found, control node 12 computes the processing energy for each node and assigns the computing node with the minimum processing energy to the tier. Control node 12 remotely powers on the assigned node and remotely boots the node with the image instance associated with the node slot. Additionally, the booted computing node inherits the network address associated with the node slot.

If there are no adequate computing nodes in the free pool, i.e., no nodes at all or no nodes that match the minimal node requirements of the tier, control node 12 identifies the tiers with a lower priority than the tier needing more processing capacity (96).

Control node 12 determines which of the nodes of the lower priority tiers meet the minimum requirements of the tier in need of processing capacity (98). Control node 12 may, for example, compare the attributes of each of the nodes assigned to node slots of the lower priority tiers to the node requirements of the tier in need of processing capacity. Lower priority tiers that have the minimum number of computing nodes may be removed from possible tiers from which to harvest an application node. If, however, all the lower priority tiers have the minimum number of computing nodes defined for the respective tier, the lowest priority tier is selected from which to harvest the one or more nodes.

Control node 12 calculates the processing energy of each of the nodes of the lower priority tiers that meet the minimum requirements (100). The energies of the nodes are calculated using the differences between the node attributes and the node requirements of the tier needing additional capacity. Control node 12 selects the computing node with the lowest processing energy that meets the minimum requirements, and assigns the selected computing node to the tier in need of processing capacity (102, 95).

Figure 6:
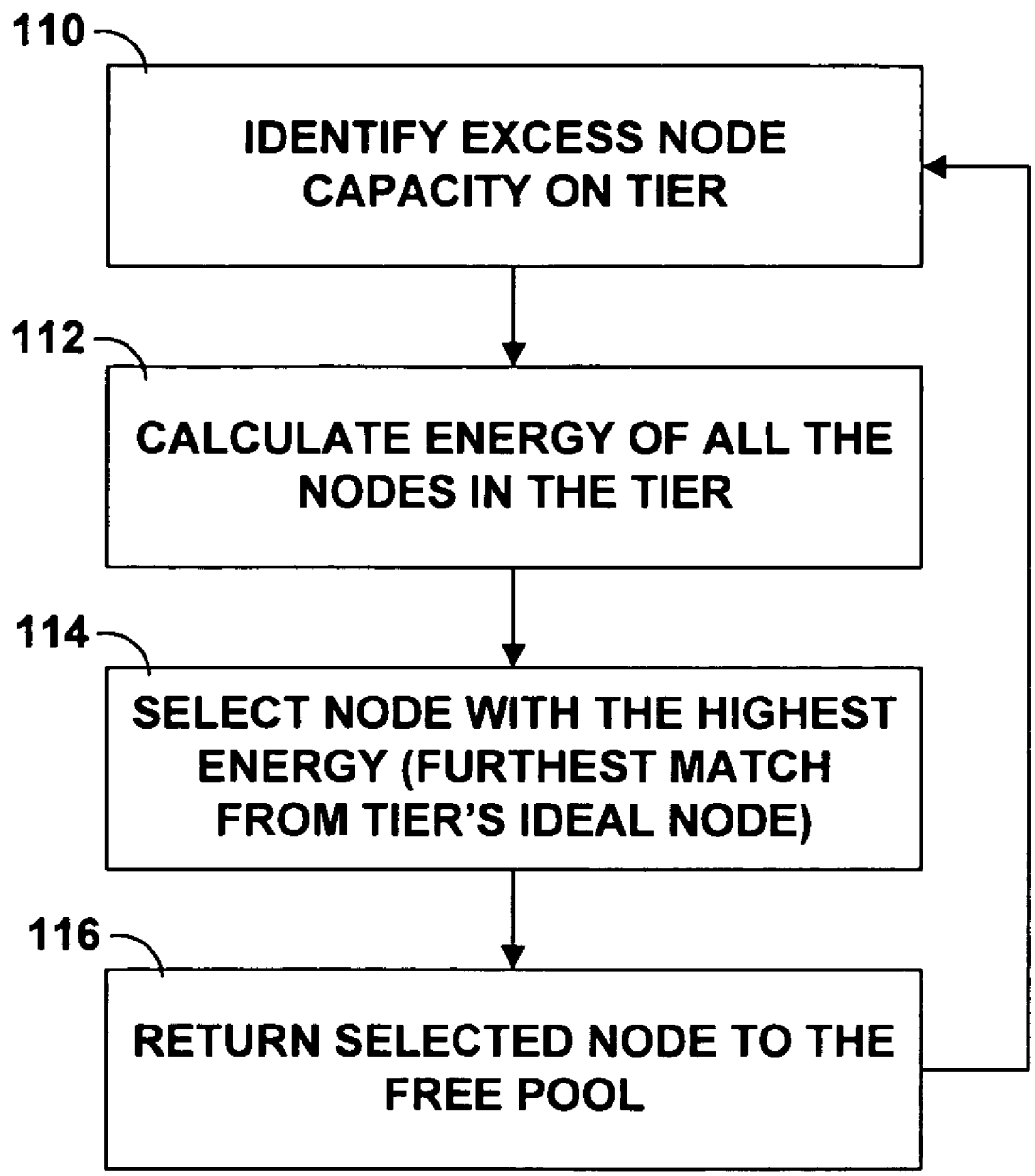
FIG. 6 is a flow diagram illustrating exemplary operation of a control node harvesting excess node capacity from one of the tiers and returning the harvested computing node to the free pool.

FIG. 6 is a flow diagram illustrating exemplary operation of control node 12 when harvesting excess node capacity from one of the tiers and returning the harvested computing node to free pool 13. Initially, control node 12 identifies a tier having excess node capacity (110). Control node 12 may, for example, periodically check the node capacity of the tiers to identify any tiers having excess node capacity. Performing a periodic check and removal of excess nodes increases the likelihood that a capable computing node will be in free pool 13 in the event one of the tiers needs additional node capacity.

When harvesting a node, control node 12 calculates the processing energy of all the nodes in the tier as described above with reference to FIG. 4 (112). Control node 12 identifies the node within the tier with the highest processing energy and returns the identified node to the free pool of nodes (114, 116). As described above, the node with the highest processing energy corresponds to the node whose node attributes are the most in excess of the node requirements of the tier.

Returning the node to the free pool may involve remotely powering off the computing node and updating the database to associate the harvested node with free pool 13. In addition, control node 12 updates the database to disassociate the returned node with the node slot to which it was assigned. At this point, the node no longer uses the network address associated with the image instance mapped to the node slot. Control node 12 may, therefore, assign a temporary network address to the node while the node is assigned to free pool 13.

Figure 7:
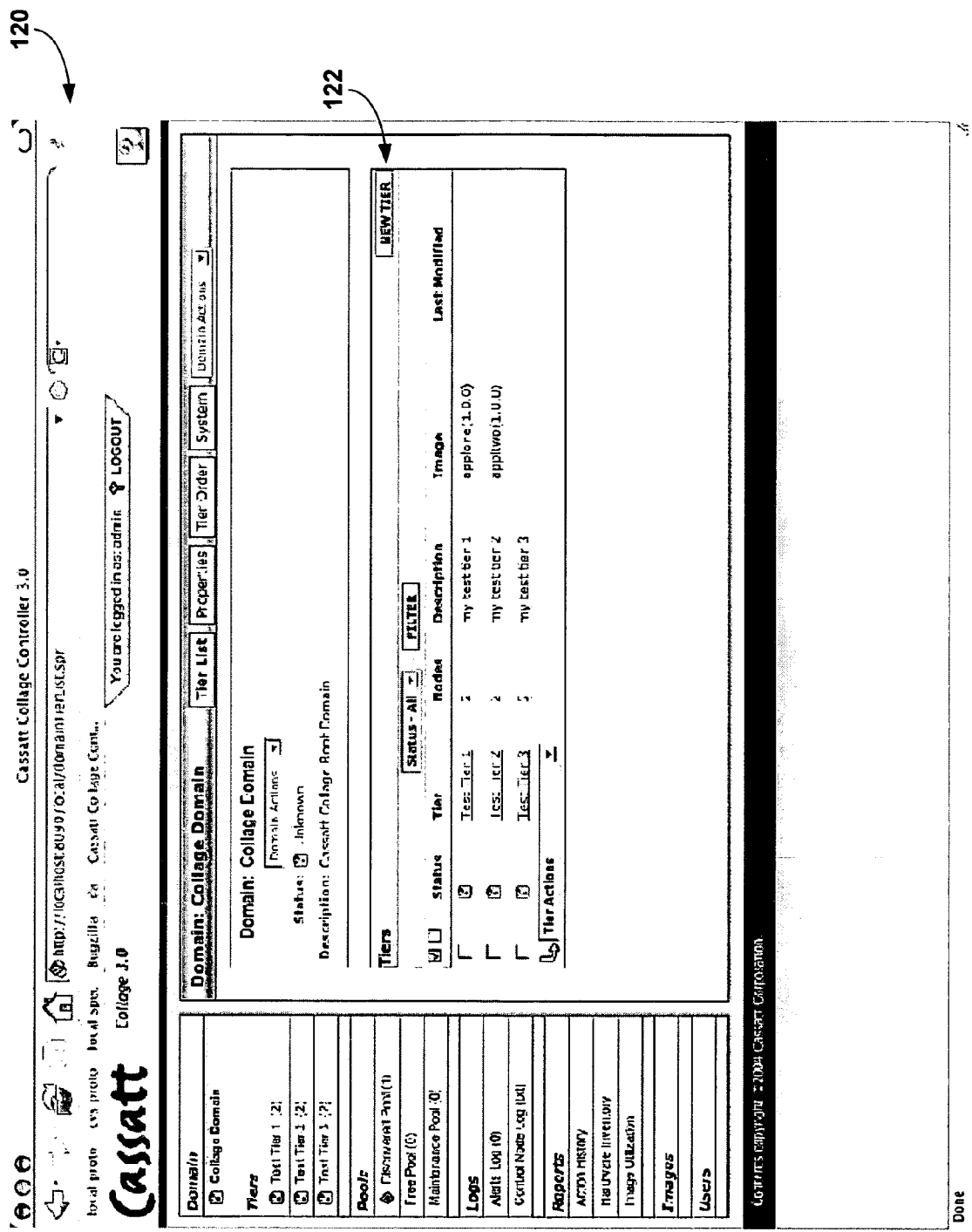
FIG. 7 is a screen illustration of an exemplary user interface for defining tiers in a particular domain.

FIG. 7 is a screen illustration of an exemplary user interface 120 presented by control node 12 with which administrator 20 interacts to define tiers for a particular domain. In the example illustrated in FIG. 7, system administrator 20 has selected the "Collage Domain." User interface 120 presents the tiers that are currently in the selected domain. In the example illustrated, the Collage Domain includes three tiers, "test tier 1," "test tier 2," and "test tier 3." As shown in FIG. 7, in this example, each of the tiers includes two nodes. In addition, user interface 120 lists the type of software image currently deployed to application nodes for each of the tiers. In the example illustrated, image "applone (1.0.0)" is deployed to the nodes of test tier 1 and image "appltwo (1.0.0)" is deployed to the nodes of test tier 2. System administrator 20 may add one or more tiers to the domain by clicking on new tier button 122.

Figure 8:
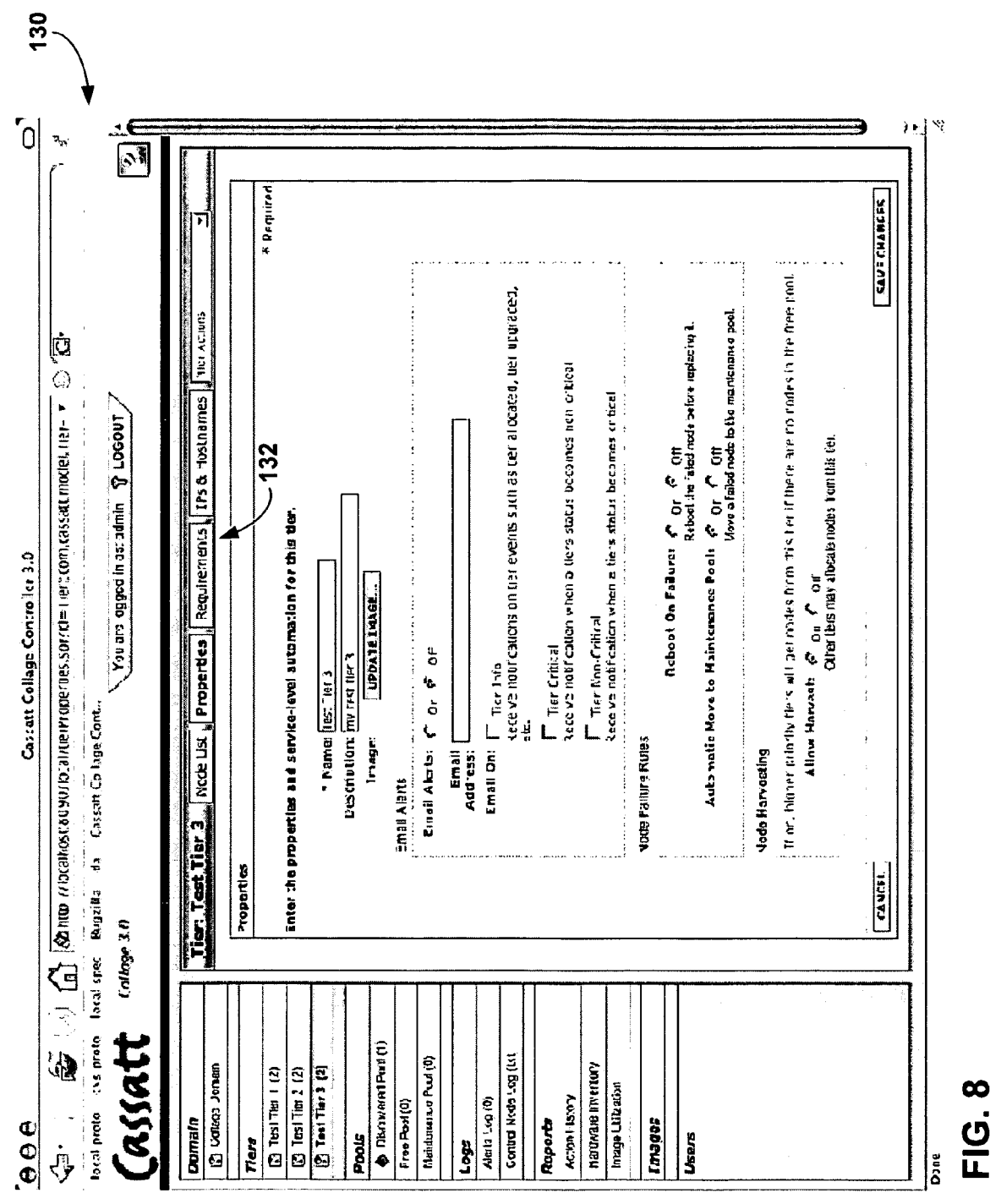

FIG. 8 is a screen illustration of an exemplary user interface 130 for defining properties of the tiers. In particular, user interface 130 allows system administrator 20 to input a name for the tier, a description of the tier, and an image associated with the tier. The image associated with the tier refers to a master image from which image instances are generated and deployed to the nodes assigned to the tier.

When configuring a tier, system administrator 20 may elect to activate email alerts. For example, system administrator 20 may activate the email alerts feature in order to receive email alerts providing system administrator 20 with critical and/or non-critical tier information, such as a notification that a tier has been upgraded, a node of the tier has failed or the like. Furthermore, system administrator 20 may input various policies, such node failure rules. For example, system administrator 20 may identify whether control node 12 should reboot a node in case of failure or whether the failed node should automatically be moved to maintenance pool 17. Similarly, system administrator 20 may identify whether nodes assigned to the tier may be harvested by other tiers.

User interface 130 may also allow system administrator 20 to input node requirements of a tier. In order to input node requirements of a tier, system administrator 20 may click on the "Requirements" tab 132, causing user interface 130 to present an input area to particular node requirements of the tier.

Figure 9:
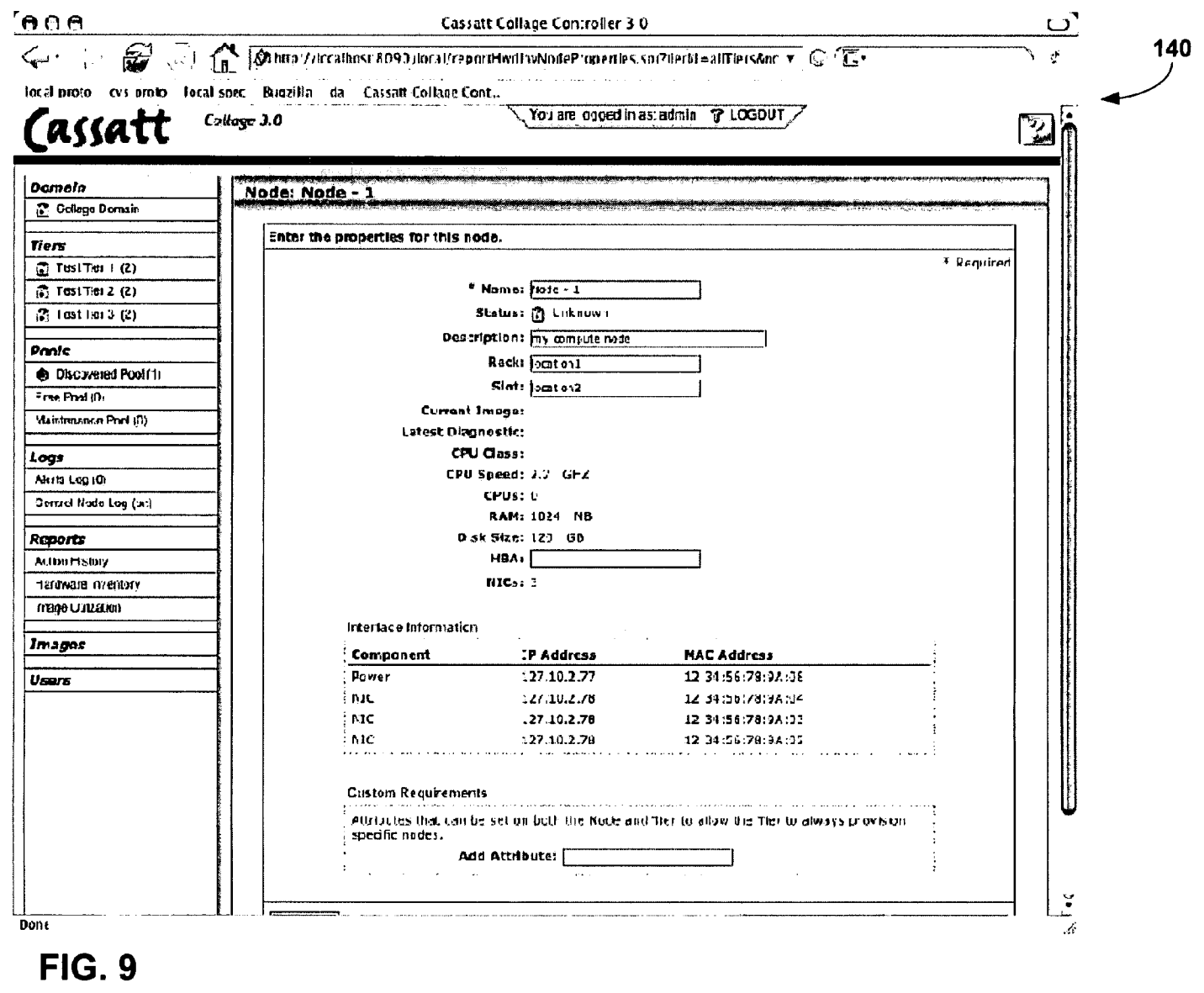

FIG. 9 is a screen illustration of an exemplary user interface 140 for viewing and identifying properties of a computing node. User interface 140 allows system administrator 20 to define a name, description, and location (including a rack and slot) of a computing node. In addition user interface 140 may specify user-defined properties of a node, such as whether the computing node has I/O HBA capabilities.

User interface 140 also displays properties that control node 12 has identified during the computing node inventory process. In this example, user interface 140 presents system administrator 20 with the a CPU node count, a CPU speed, the amount of RAM, the disk size and other characteristics that are identifiable during the automated node inventory. User interface 140 additionally presents interface information to system administrator 20. Specifically, user interface 140 provides system administrator 20 with a list of components and their associated IP and MAC addresses.

User interface 140 also allows system administrator 20 to define other custom requirements. For example, system administrator 20 may define one or more attributes and add those attributes to the list of node attributes presented to system administrator 20.

Figure 10:
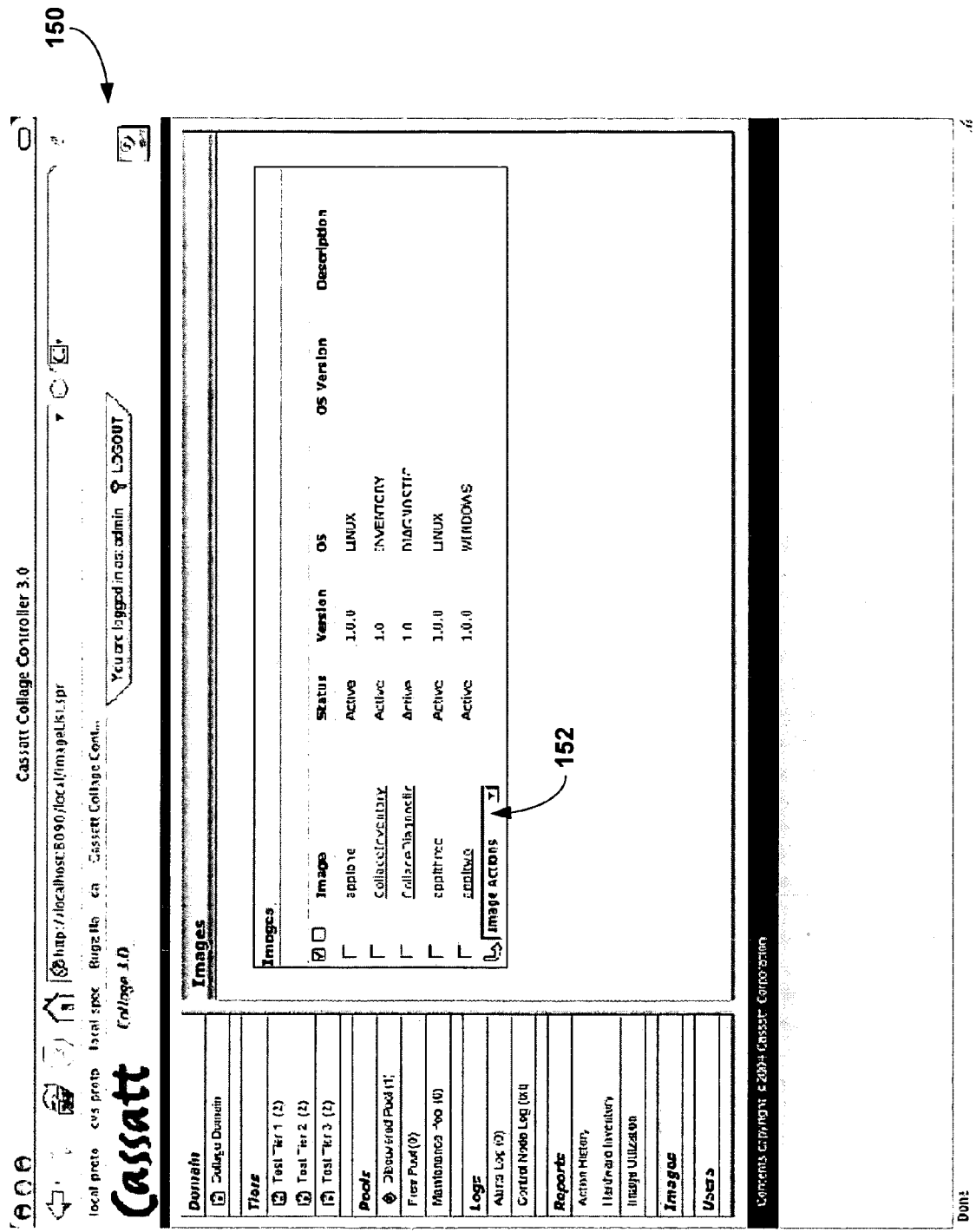
FIG. 10 is a screen illustration of an exemplary user interface for viewing software images.

FIG. 10 is a screen illustration of an exemplary user interface 150 for viewing software images. User interface 150 presents to a system administrator or another user a list of images maintained by control node 12 within image repository 26. The image list further includes the status of each image (i.e., either active or inactive), the version of the image, the operating system on which the image should be run, the operating system version on which the image should be run and a brief description of the image.

System administrator 20 or another user may select an image by clicking on the box in front of the image identifier/name and perform one or more actions on the image. Actions that system administrator 20 may perform on an image include deleting the image, updating the image, and the like. System administrator 20 may select one of the image actions via dropdown menu 152. In some embodiments, user interface 150 may further display other details about the images such as the node to which the images are assigned (if the node status is "active"), the network address associated with the images and the like.

Figure 11:
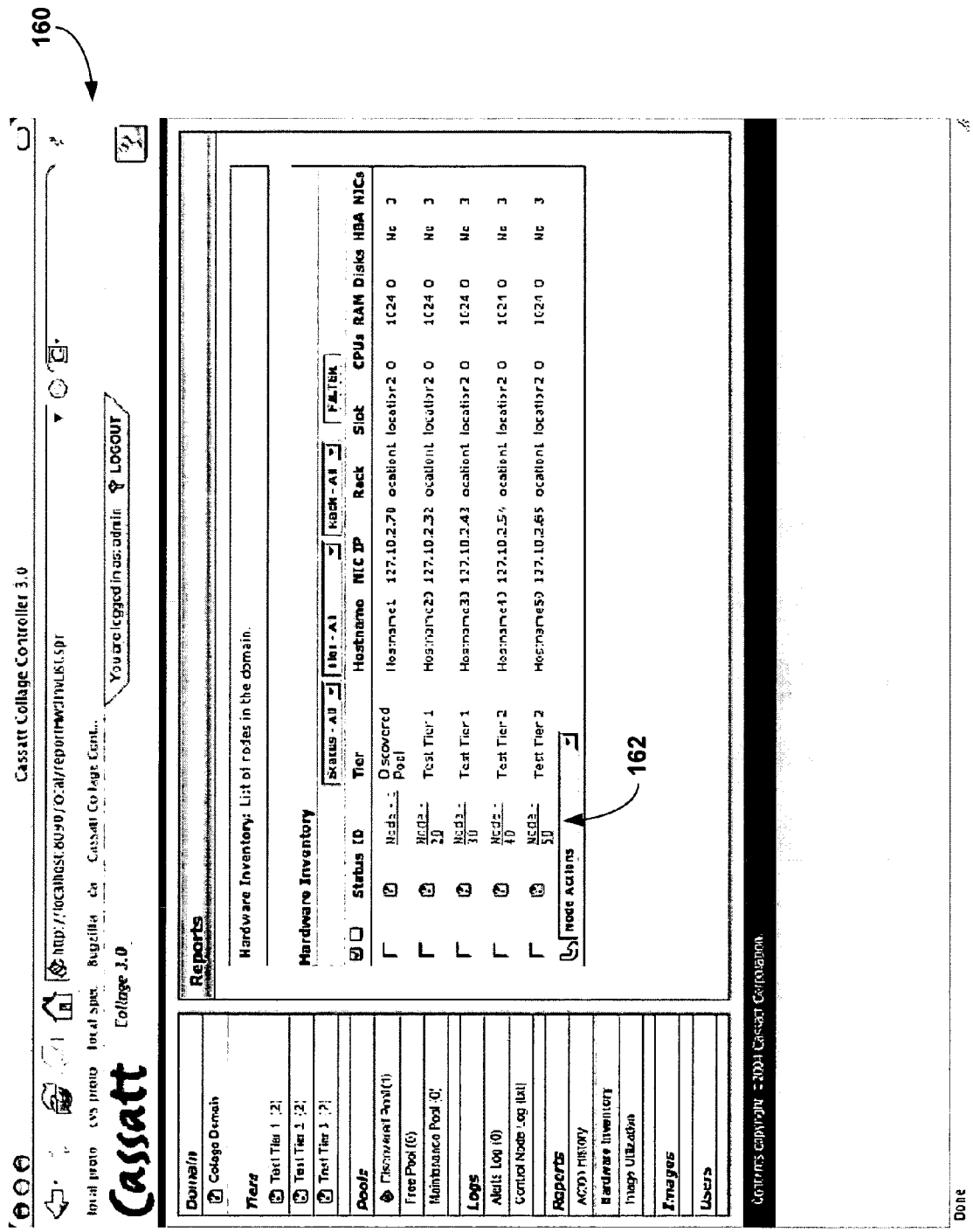
FIG. 11 is a screen illustration of an exemplary user interface for viewing a hardware inventory report.

FIG. 11 is a screen illustration of an exemplary user interface 160 for viewing a hardware inventory report. User interface 160 presents to system administrator 20 or another user a list of the nodes that are currently assigned to a domain. System administrator 20 may elect to view the nodes for the entire domain, for a single tier within the domain or for a single rack within a tier.

For each node, user interface 160 presents a node ID, a status of the node, the tier to which the node belongs, a hostname associated with the node, a NIC IP address, a rack location, a slot location, the number of CPU's of the node, the amount of RAM on the node, the number of disks on the node, whether the node has I/O HBA, and the number of NICs of the node.

System administrator 20 or other user may select a node by clicking on the box in front of the node identifier/name and perform one or more actions on the node. Actions that system administrator 20 may perform on the node include deleting the node, updating the node attributes or other properties of the node, and the like. System administrator 20 may select one of the node actions via dropdown menu 162.

Figure 12:
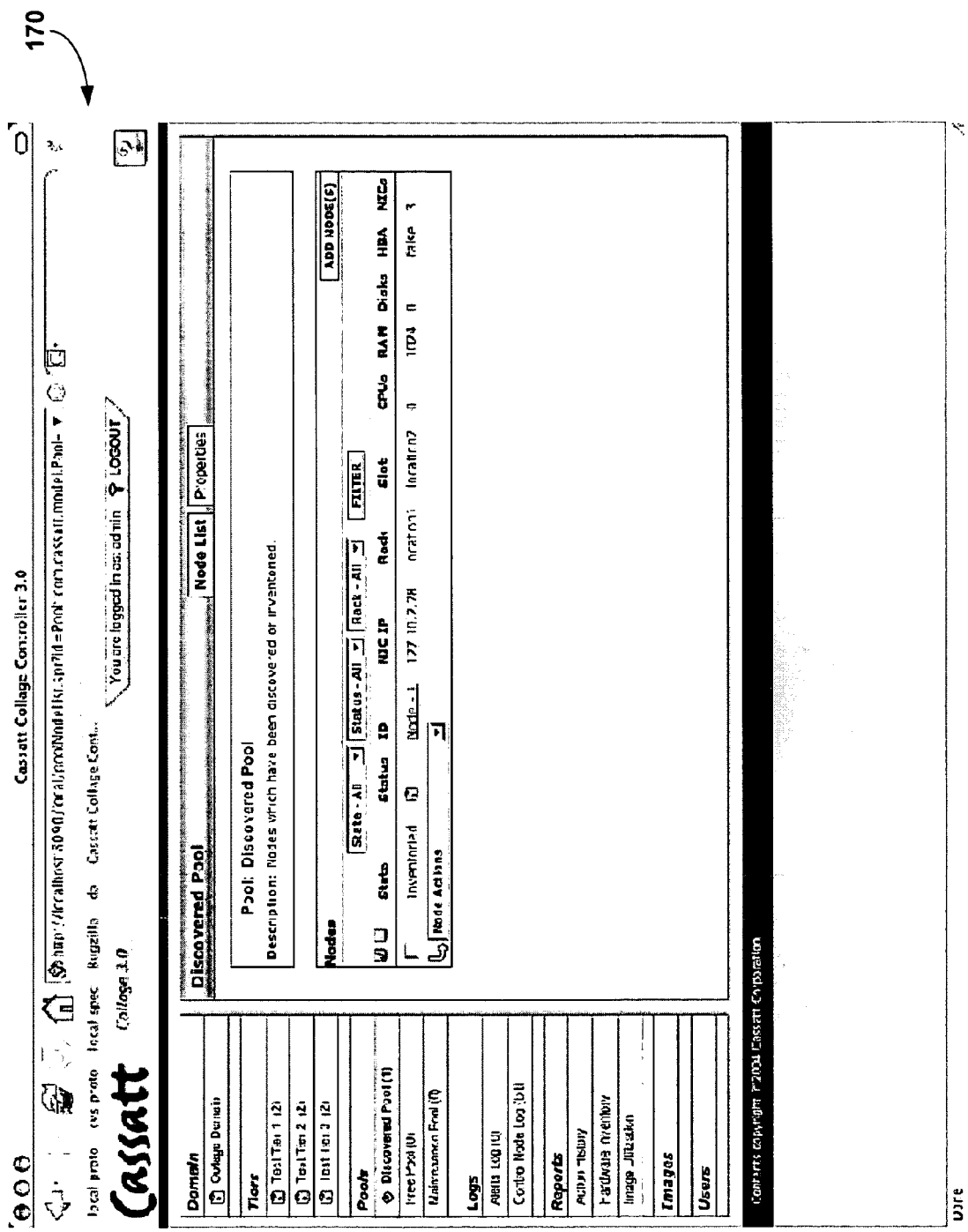
FIG. 12 is a screen illustration of an exemplary user interface for viewing discovered nodes that are located in the free pool.

FIG. 12 is a screen illustration of an exemplary user interface 170 for viewing discovered nodes that are located in discovered pool 11. For each node, user interface 170 presents a node ID, a state of the node, a NIC IP address, a rack location, a slot location, the number of CPU's of the node, the amount of RAM on the node, the number of disks on the node, whether the node has I/O HBA, and the number of NICs of the node.

Figure 13:
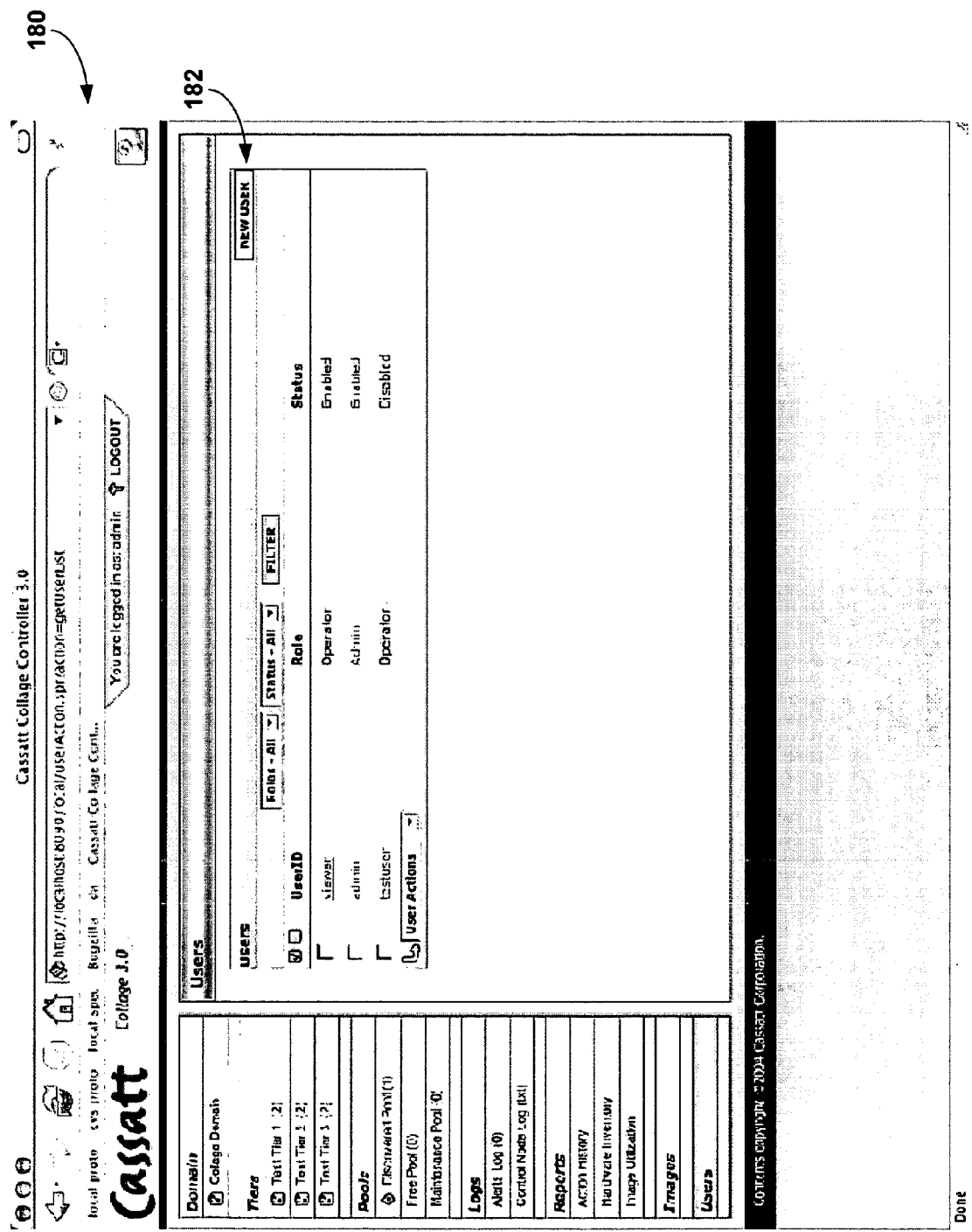
FIG. 13 is a screen illustration of an exemplary user interface for viewing users of a distributed computing system.

FIG. 13 is a screen illustration of an exemplary user interface 180 for viewing users of distributed computing system 10. User interface 180 presents a list of users as well as the role assigned to each of the users and the status of each of the users. Thus, system administrator 20 may define different roles to each of the users. For example, a user may be either an operator (i.e., general user) or an administrator. System administrator 20 may add a new user to the list of users by clicking on the "New User" button 182.

Figure 14:
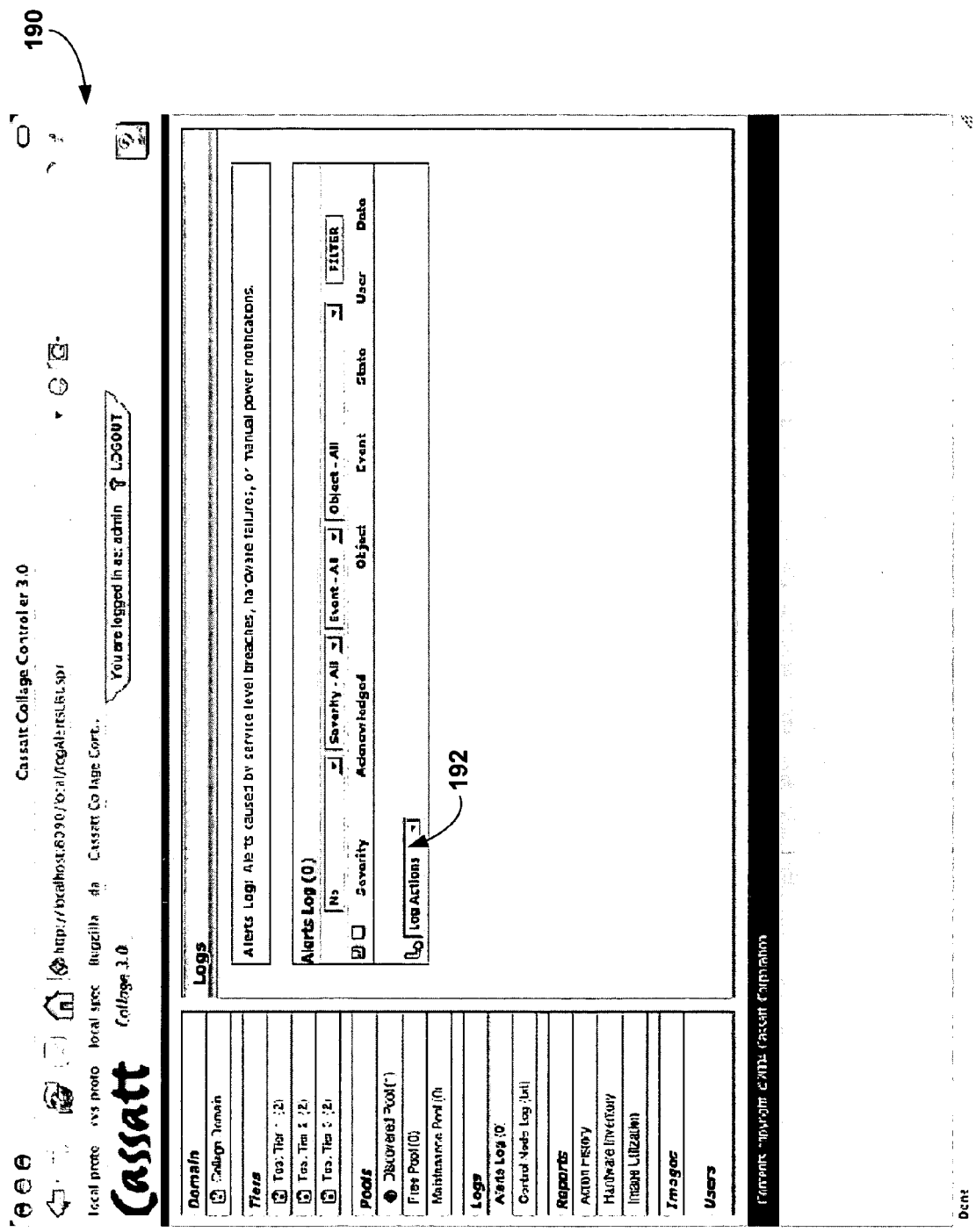
FIG. 14 is a screen illustration of an exemplary user interface for viewing alerts for the distributed computing system.

FIG. 14 is a screen illustration of an exemplary user interface 190 for viewing alerts for distributed computing system 10. For each of the alerts, user interface 190 identifies the severity of the alert, whether the alert has been acknowledged, an object associated with the alert, an event associated with the alert, a state of the alert, a user associated with the alert and a date associated with the alert.

System administrator 20 or other user may select an alert by clicking on the box in front of the logged alert and perform one or more actions on the logged alert. Actions that system administrator 20 may perform include deleting the alert, changing the status of the alert, or the like. System administrator 20 may specify the log actions via dropdown menu 192.

Figure 15:
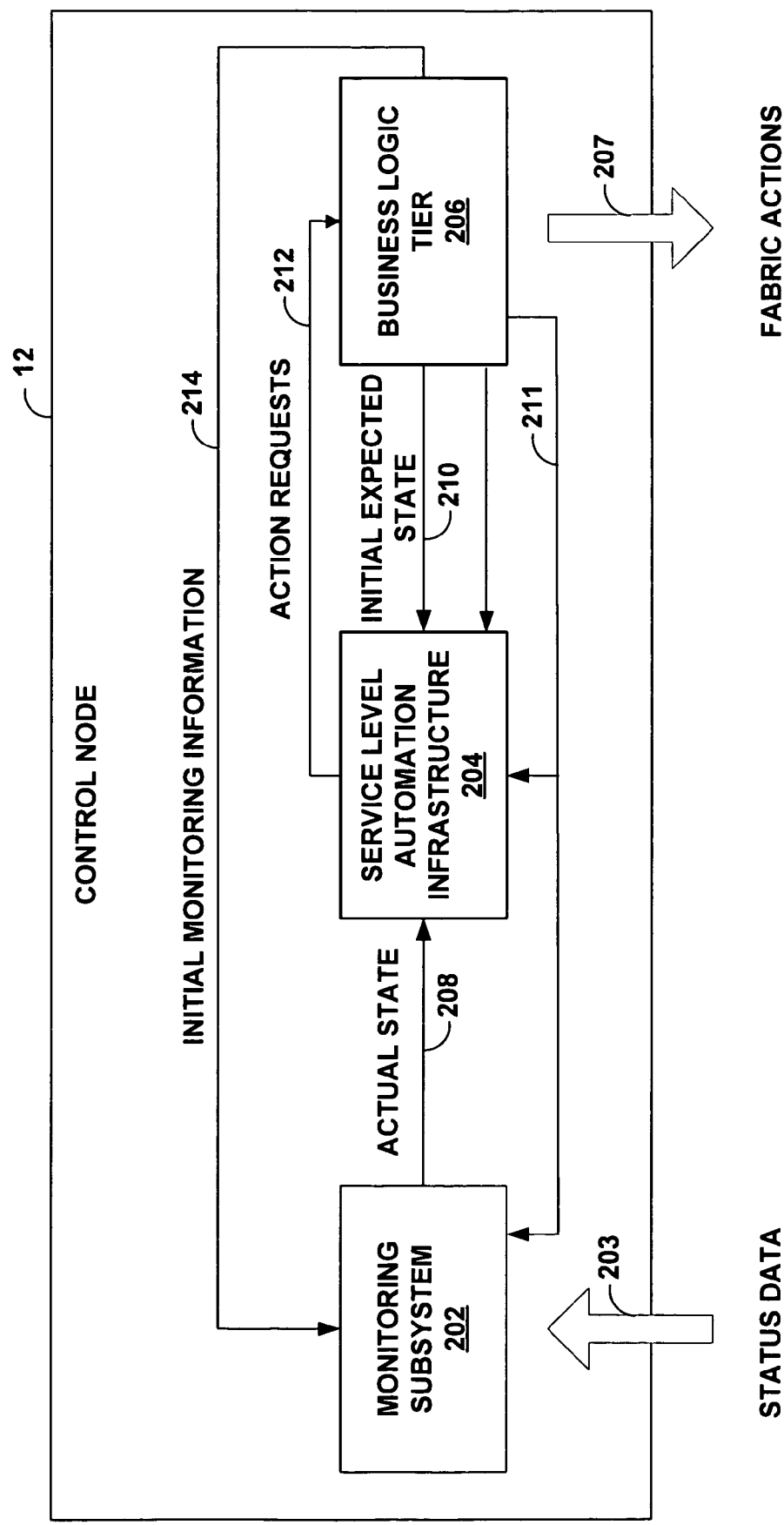
FIG. 15 is a block diagram illustrating one embodiment of control node that includes a monitoring subsystem, a service level automation infrastructure (SLAI), and a business logic tier (BLT).

FIG. 15 is a block diagram illustrating one embodiment of control node 12 in further detail. In the illustrated example, control node 12 includes a monitoring subsystem 202, a service level automation infrastructure (SLAI) 204, and a business logic tier (BLT) 206.

Monitoring subsystem 202 provides real-time monitoring of the distributed computing system 10. In particular, monitoring subsystem 202 dynamically collects status data 203 from the hardware and software operating within distributed computing system 10, and feeds the status data in the form of monitor inputs 208 to SLAI 204. Monitoring inputs 208 may be viewed as representing the actual state of the fabric defined for the organizational model implemented by distributed computing system 10. Monitoring subsystem 202 may utilize well defined interfaces, e.g., the Simple Network Management Protocol (SNMP) and the Java Management Extensions (JMX), to collect and export real-time monitoring information to SLAI 204.

SLAI 204 may be viewed as an automation subsystem that provides support for autonomic computing and acts as a central nervous system for the controlled fabric. In general, SLAI 204 receives monitoring inputs 208 from monitoring subsystem 202, analyzes the inputs and outputs appropriate action requests 212 to BLT 206. In one embodiment, SLAI 204 is a cybernetic system that controls the defined fabric via feedback loops. More specifically, administrator 20 may interact with BLT 206 to define an expected state 210 for the fabric. BLT 206 communicates expected state 210 to SLAI 204. SLAI 204 receives the monitoring inputs from monitoring subsystem 202 and applies rules to determine the most effective way of reducing the differences between the expected and actual states for the fabric.

For example, SLAI 204 may apply a rule to determine that a node within a high priority tier has failed and that the node should be replaced by harvesting a node from a lower priority tier. In this example, SLAI 204 outputs an action request 212 to invoke BLT 206 to move a node from one tier to the other.

In general, BLT 206 implements high-level business operations on fabrics, domains and tiers. SLAI 204 invokes BLT 206 to bring the actual state of the fabric into accordance with the expected state. In particular, BLT 206 outputs fabric actions 207 to perform the physical fabric changes. In addition, BLT 206 outputs an initial expected state 210 to SLAI 204 and initial monitoring information 214 to SLAI 204 and monitoring subsystem 202, respectively. In addition, BLT 206 outputs notifications 211 to SLAI 204 and monitoring subsystem 202 to indicate the state and monitoring changes to distributed computing system 10. As one example, BLT 206 may provide control operations that can be used to replace failed nodes. For example, BLT 206 may output an action request indicating that a node having address 10.10.10.10 has been removed from tier ABC and a node having address 10.10.10.11 has been added to tier XYZ. In response, monitoring subsystem 202 stops attempting to collect status data 203 from node 10.10.10.10 and starts monitoring for status data from node 10.10.10.11. In addition, SLAI 204 updates an internal model to automatically associate monitoring inputs from node 10.10.10.11 with tier XYZ.

Figure 16:
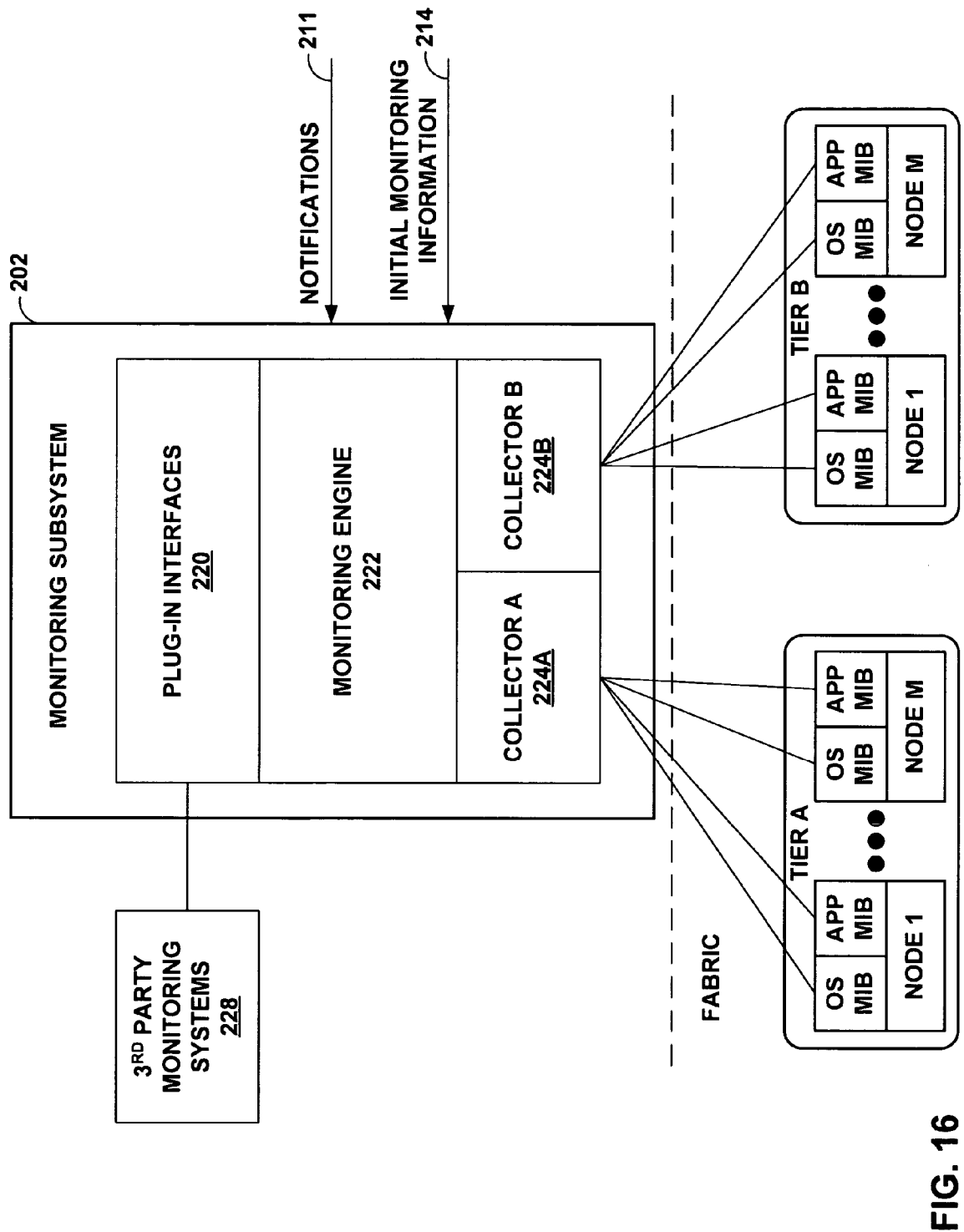
FIG. 16 is a block diagram illustrating one embodiment of the monitoring subsystem.

FIG. 16 is a block diagram illustrating one embodiment of monitoring subsystem 202. In general, monitoring subsystem 202 dynamically detects and monitors a variety of hardware and software components within the fabric. For example, monitoring subsystem 202 identifies, in a timely and efficient manner, any computing nodes that have failed, i.e., any node that does not respond to a request to a known service. More generally, monitoring subsystem 202 provides a concise, consistent and constantly updating view of the components of the fabric.

As described further below, monitoring subsystem 202 employs a modular architecture that allows new detection and monitoring collectors 224 to be "plugged-in" for existing and new protocols and for existing and new hardware and software. As illustrated in FIG. 16, monitoring subsystem 202 provides a plug-in architecture that allows different information collectors 224 to be installed. In general, collectors 224 are responsible for protocol-specific collection of monitoring information. The plug-in architecture allows for new protocols to be added by simply adhering to a collector plug-in signature. In this example, monitoring subsystem 202 includes collectors 224A and 224B for collecting information from operating systems and applications executing on nodes within tier A and tier B, respectively.

In one embodiment, collectors 224 are loaded at startup of control node 12 and are configured with information retrieved from BLT 206. Monitoring engine 222 receives collection requests from SLAI 204, sorts and prioritizes the requests, and invokes the appropriate one of collectors 224 based on the protocol specified in the collection requests. The invoked collector is responsible for collecting the required status data and returning the status data to monitoring engine 222. If the collector is unable to collect the requested status data, the collector returns an error code.

In one embodiment, collectors 224 are Java code compiled into a jar file and loaded with a class loader at run time. Each of collectors 224 has an associated configuration file written in a data description language, such as the extensible markup language (XML). In addition, a user may interact with BLT 206 to add run-time configuration to dynamically configure collectors 224 for specific computing environments. Each of collectors 224 expose an application programming interface (API) to monitoring engine 222 for communication and data exchange.

A user, such as a system administrator, specifies the protocol or protocols to be used for monitoring a software image when the image is created. In addition, the users may specify the protocols to be used for monitoring the nodes and each service executing on the nodes. Example protocols supported by the collectors 224 include Secure Shell (SSH), Simple Network Management Protocol (SNMP), Internet Control Message Protocol (ICMP) ping, Java Management Extensions (JMX) and the Hypertext Transfer Protocol (HTTP).

Some protocols require special privileges, e.g., root privileges, to perform the required data collection. In this case, the corresponding collectors 224 communicate with a separate process that executes as the root. Moreover, some protocols may require deployment and/or configuration of data providers within the fabric. Software agents may, for example, be installed and configured on nodes and configured on other hardware. If needed, custom in-fabric components may be deployed.

In this example, the modular architecture of monitoring subsystem 202 also supports one or more plug-in interfaces 220 for data collection from a wide range of third-party monitoring systems 228. Third-party monitoring systems 228 monitor portions of the fabric and may be vendor-specific.

Figure 17:
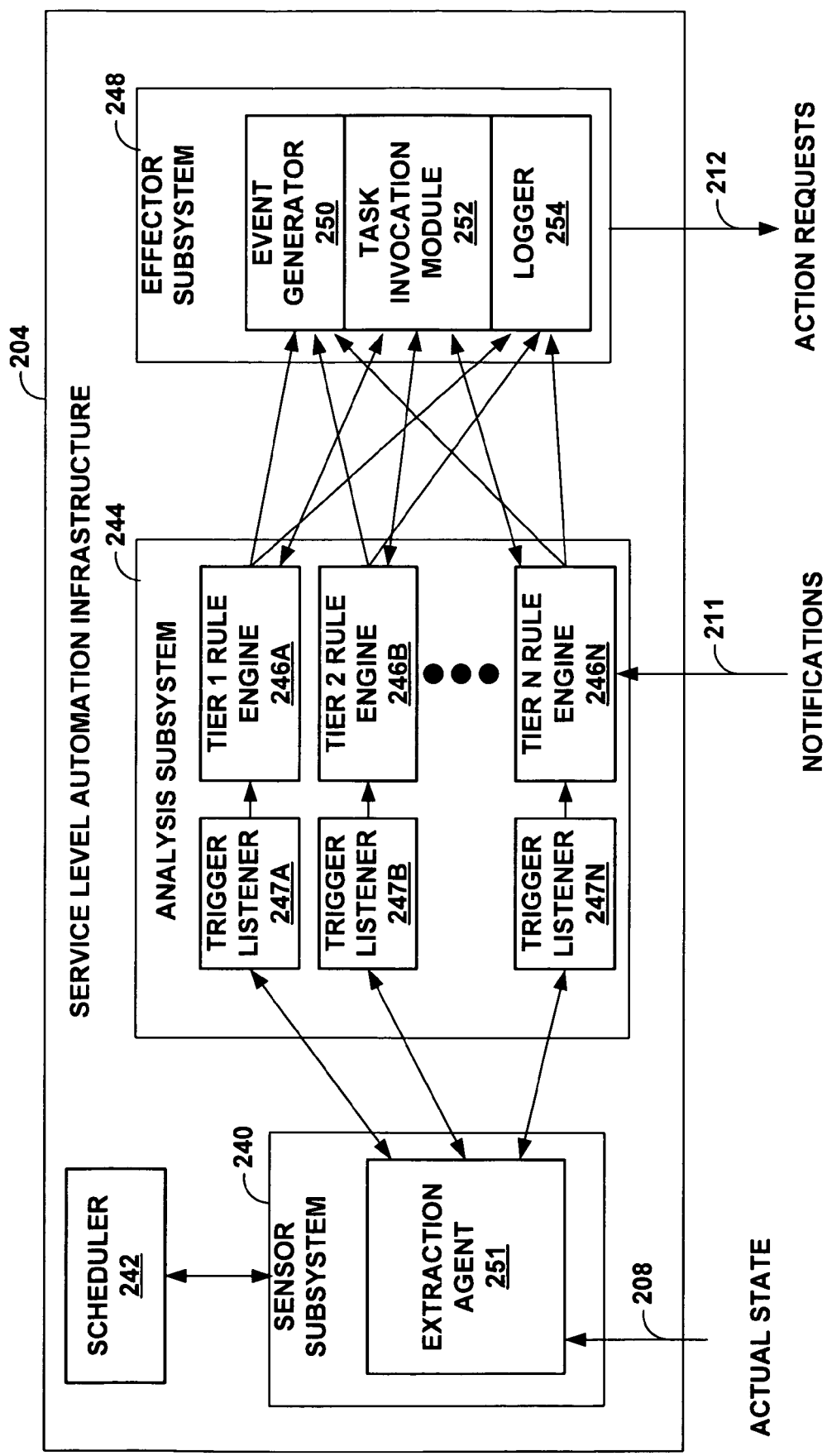
FIG. 17 is a block diagram illustrating one embodiment of the SLAI in further detail.

FIG. 17 is a block diagram illustrating one embodiment of SLAI 204 in further detail. In the illustrated embodiment, SLAI 204 is composed of three subsystems: a sensor subsystem 240, an analysis subsystem 244 and an effector subsystem 248.

In general, sensor subsystem 240 receives actual state data from monitoring subsystem 202 in the form of monitoring inputs 208 and supplies ongoing, dynamic input data to analysis subsystem 244. For example, sensor subsystem 240 is notified of physical changes to distributed computing system 10 by monitoring subsystem 202. Sensor subsystem 240 uses the state data received from monitoring subsystem 202 to maintain ongoing, calculated values that can be sent to analysis subsystem 244 in accordance with scheduler 242.

In one embodiment, sensor subsystem 240 performs time-based hierarchical data aggregation of the actual state data in accordance with the defined organization model. Sensor subsystem 240 maintains organizational data in a tree-like structure that reflects the current configuration of the hierarchical organization model. Sensor subsystem 240 uses the organizational data to perform the real-time data aggregation and map tiers and domains to specific nodes. Sensor subsystem 240 maintains the organizational data based on notifications 211 received from BLT 206.

Sensor subsystem 240 sends inputs to analysis subsystem 244 to communicate the aggregated data on a periodic or event-driven basis. Analysis subsystem 244 may register an interest in a particular aggregated data value with sensor subsystem 240 and request updates at a specified frequency. In response, sensor subsystem 240 interacts with monitoring subsystem 202 and scheduler 242 to generate the aggregated data required by analysis subsystem 244.

Sensor subsystem 240 performs arbitrary data aggregations via instances of plug-in classes (referred to as "triggers") that define the aggregations. Each trigger is registered under a compound name based on the entity being monitored and the type of data being gathered. For example, a trigger may be defined to aggregate and compute an average computing load for a tier every five minutes. Analysis subsystem 244 requests the aggregated data based on the registered names. In some embodiments, analysis subsystem 244 may define calculations directly and pass them to sensor subsystem 240 dynamically.

Analysis subsystem 244 is composed of a plurality of forward chaining rule engines 246A-246N. In general, rule engines 246 match patterns in a combination of configuration data and monitoring data, which is presented by extraction agent 251 in the form of events. Events contain the aggregated data values that are sent to rule engines 246 in accordance with scheduler 242.

Sensor subsystem 240 may interact with analysis subsystem 244 via trigger listeners 247 that receives updates from a trigger within sensor subsystem 240 when specified events occur. An event may be based on system state (e.g., a node transitioning to an up or down state) or may be time based.

Analysis subsystem 244 allows rule sets to be loaded in source form and compiled at load time into discrimination networks. Each rule set specifies trigger-delivered attributes. Upon loading the rule sets, analysis subsystem 244 establishes trigger listeners 247 to receive sensor notifications and update respective working memories of rule engines 246. As illustrated in FIG. 17, each of rule engines 246 may serve a different tier defined within the fabric. Alternatively, multiple rule engines 246 may serve a single tier or a single rule engine may serve multiple tiers.

Rule engines 246 process the events and invoke action requests via calls to effector subsystem 248. In addition, rule engines 246 provide a call-back interface so that effector subsystem 248 can inform a rule engine when an action has completed. Rule engines 246 prevent a particular rule from re-firing as long as any action invoked by the rule has not finished. In general, rules contain notification calls and service invocations though either may be disabled by configuration of effector subsystem 248. BLT 206 supplies initial system configuration descriptions to seed each of rule engines 246.

In general, rule engines 246 analyze the events and discover discrepancies between an expected state of the fabric and an actual state. Each of rule engines 246 may be viewed as software that performs logical reasoning using knowledge encoded in high-level condition-action rules. Each of rule engines 246 applies automated reasoning that works forward from preconditions to goals defined by system administrator 20. For example, rule engines 246 may apply modus ponens inferences rules.

Rule engines 246 output requests to effector subsystem 248 which produce actions requests 212 for BLT 206 to resolve the discrepancies. Effector subsystem 248 performs all operations on behalf of analysis subsystem 244. For example, event generator 250, task invocation module 252 and logger 254 of effector subsystem 248 perform event generation, BLT action invocation and rule logging, respectively. More specifically, task invocation module 252 invokes asynchronous operations within BLT 206. In response, BLT 206 creates a new thread of control for each task which is tracked by a unique task identifier (task id). Rules engine 246 uses the task id to determine when a task completes and, if needed, to re-fire any rules that were pended until completion of the task. These tasks may take arbitrary amounts of time, and rules engine 246 tracks the progress of individual task via change notifications 211 produced by BLT 206.

Event generator 250 creates persistent event records of the state of processing of SLAI 204 and stores the event records within a database. Clients uses these event records to track progress and determine the current state of the SLAI 204.

Logger 254 generates detailed trace information about system activities for use in rule development and debugging. The logging level can be raised or lowered as needed without changing operation of SLAI 204.

Figure 18:
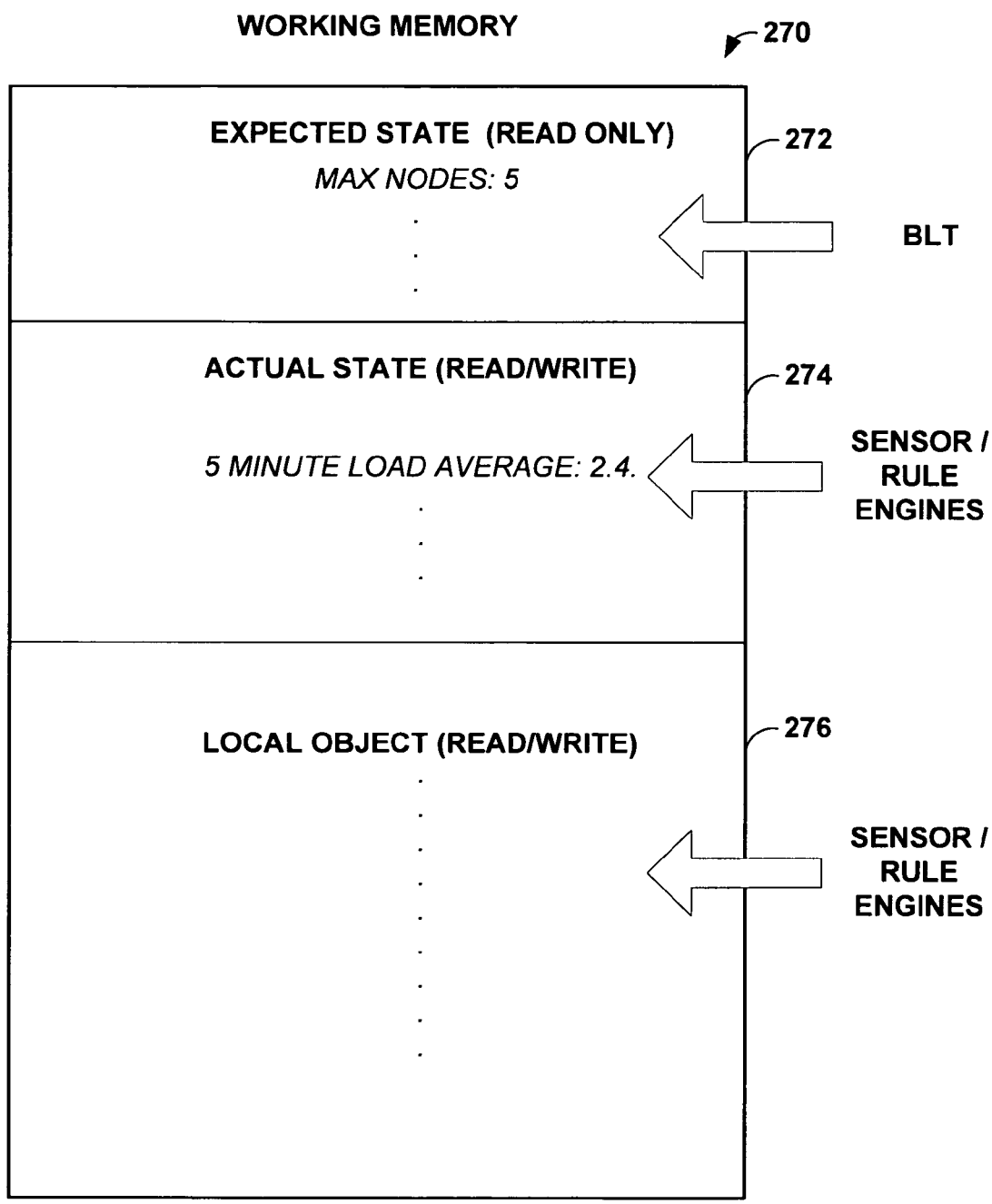
FIG. 18 is a block diagram of an example working memory associated with rule engines of the SLAI.

FIG. 18 is a block diagram of an example working memory 270 associated with rule engines 246. In this example, working memory 270 includes a read-only first data region 272 that stores the expected state received from BLT 206. Data region 272 is read-only in the sense that it cannot be modified in response to a trigger from sensor subsystem 240 or by rule engines 246 without notification from BLT 206.

In addition, working memory 270 includes a second data region 274 that is modifiable (i.e., read/write) and may be updated by monitoring subsystem 202 or used internally by rule engines 246. In general, data region 274 stores aggregated data representing the actual state of the fabric and can be updated by sensor subsystem 240 or by rule engines 246. The actual state may consist of a set of property annotations that can be attached to objects received from BLT 206 or to objects locally defined within a rule engine, such as local object 276.

Figure 19:
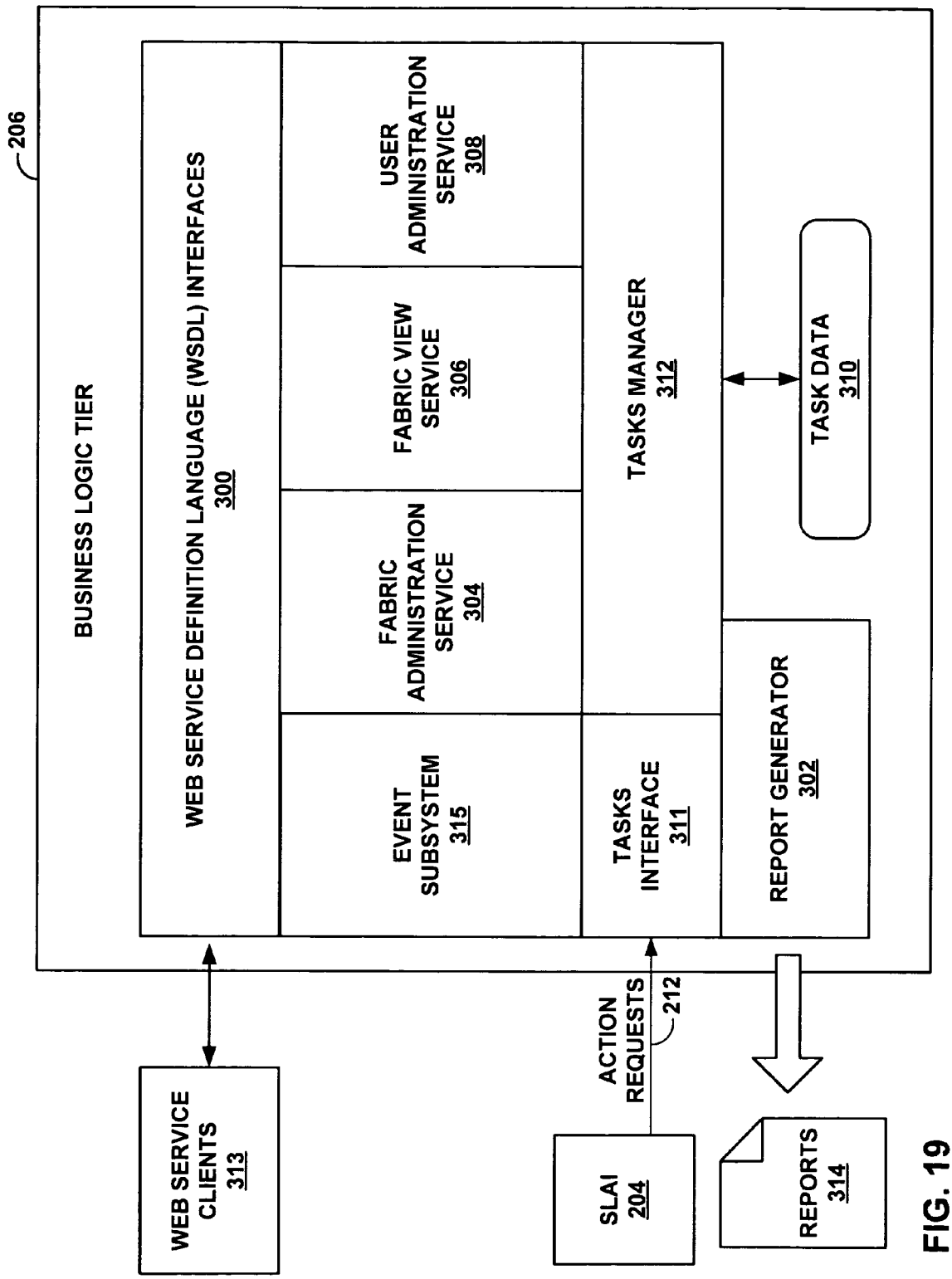
FIG. 19 is a block diagram illustrating an example embodiment for the BLT of the control node.

FIG. 19 is a block diagram illustrating an example embodiment for BLT 206. In this example, BLT 206 includes a set of one or more web service definition language (WSDL) interfaces 300, a report generator 302, a fabric administration interface service 304, a fabric view service 306, a user administration service 308, a task interface 311, a task manager 312 and an event subsystem 315.

As described, BLT 206 provides the facilities necessary to create and administer the organizational model (e.g., fabric, domains, tiers and nodes) implemented by distributed computing system 10. In general, BLT 206 abstracts access to the persisted configuration state of the fabric, and controls the interactions with interfaces to fabric hardware services. As such, BLT 206 provides fabric management capabilities, such as the ability to create a tier and replace a failed node. WSDL interfaces 300 provide web service interfaces to the functionality of BLT 206 that may be invoked by web service clients 313. Many of WSDL interfaces 300 offered by BLT 206 allow administrator 20 to define goals, such as specifying a goal of the expected state of the fabric. As further described below, rule engines 246 within SLAI 204, in turn, invoke task manager 312 to initiate one or more BLT tasks to achieve the specified goal. In general, web service clients 313 may be presentation layer applications, command line applications, or other clients.

BLT 206 abstracts all interaction with physical hardware for web service clients 313. BLT 206 is an enabling component for autonomic management behavior, but does not respond to real-time events that either prevent a goal from being achieved or produce a set of deviations between the expected state and the actual state of the system. In contrast, BLT 206 originates goals for autonomic reactions to changing configuration and state. SLAI 204 analyzes and acts upon these goals along with real-time state changes. BLT 206 sets the goals to which SLAI 204 strives to achieve, and provides functionality used by the SLAI in order to achieve the goals.

In general, BLT 206 does not dictate the steps taken in pursuit of a goal since these are likely to change based on the current state of distributed computing system 10 and changes to configurable policy. SLAI 204 makes these decisions based on the configured rule sets for the fabric and by evaluating monitoring data received from monitoring subsystem 202.

Fabric administration service 304 implements a set of methods for managing all aspects of the fabric. Example methods include methods for adding, viewing, updating and removing domains, tiers, nodes, notifications, assets, applications, software images, connectors, and monitors. Other example methods include controlling power at a node, and cloning, capturing, importing, exporting or upgrading software images. Rule engines 246 of SLAI 204 may, for example, invoke these methods by issuing action requests 212.

Task manager 312 receives action requests 212 via task interface 311. In general, task interface 311 provides an interface for receiving action requests 212 from SLAI 204 or other internal subsystem. In response, task manager 312 manages asynchronous and long running actions and are invoked by SLAI 204 to satisfy a goal or perform an action requested by a client.

Task manager 312 generates task data 310 that represents identification and status for each task. Task manager 312 returns a task identifier to the calling web service clients 313 or the internal subsystem, e.g., SLAI 204, that initiated the task. Rule engines 246 and web service clients 313 use the task identifiers to track progress and retrieve output, results, and errors associated with achieving the goal.

In one embodiment, there are no WSDL interfaces 300 for initiating specific tasks. Rather, administrator 20 interacts with BLT 206 though goal interfaces presented by WSDL interfaces 300 to define the goals for the fabric. In contrast, the term task is used to refer to internal system constructs that require no user interaction. Tasks are distinct, low-level units of work that affect the state of the fabric. SLAI 204 may combine tasks to achieve or maintain a goal state.

For example, administrator 20 can request configuration changes by either adding new goals to an object or by modifying the attributes on existing goals. Scheduled goals apply a configuration at a designated time. For example, the goals for a particular tier may specify the minimum, maximum, and target node counts for that tier. As a result, the tier can increase or decrease current node capacity by scheduling goals with different configuration values.

This may be useful, for example, in scheduling a software image upgrade. As another example, entire domains may transition online and offline per a defined grid schedule. Administrator 20 may mix and match goals on a component to achieve configurations specific to the application and environment. For example, a tier that does not support autonomic node replacement would not be configured with a harvesting goal.

In some embodiments, goals are either "in force" or "out of force." SLAI 204 only works to achieve and maintain those goals that are currently in force. SLAI 204 may applies a concept of "gravity" as the goals transition from in force to out of force. For example, SLAI 204 may transition a tier offline when an online goal is marked out of force. Some goal types may have prerequisite goals. For example, an image upgrade goal may require as a prerequisite that a tier be transitioned to offline before the image upgrade can be performed. In other embodiments, goals are always in force until modified.

SLAI 204 may automatically formulate dependencies between goals or may allow a user to specify the dependencies. For example, a user may request that a newly created tier come online. As a result of this goal, SLAI 204 may automatically direct task manager 312 to generate a task of harvesting a target number of nodes to enable the tier. Generally, all goals remain in-force by SLAI 204 until modified by BLT 206. In one embodiment, each goal remains in-force in one of three states: Satisfied, Warning, or Critical depending on how successful SLAI 204 was in achieving the goal at the time the event record was generated and stored.

In this manner, SLAI 204 controls the life cycle of a goal (i.e., the creation, scheduling, update, deletion of the goal), and provides a common implementation of these and other services such as timeout, event writing, goal conflicts, management of intra-goal dependencies, and tracking tasks to achieving the goals.

Progress toward a goal is tracked though event subsystem 315. In particular, event subsystem 315 tracks the progress of each in force goal based on the goal identifiers. Tasks executed to achieve a particular goal produce events to communicate result or errors. The events provide a convenient time-based view of all actions and behaviors.

Examples of goal types that may be defined by administrator 20 include software image management goals, node allocation goals, harvest goals, tier capacity goals, asset requirement goals, tier online/offline goals, and data gathering goals.

In one embodiment, BLT 206 presents a task interface to SLAI 204 for the creation and management of specific tasks in order to achieve the currently in force goals. In particular, rule engines 246 invoke the task interface based on evaluation of the defined rule sets in view of the expected state and actual state for the fabric. Example task interfaces include interfaces to: reserve node resources; query resources for a node slot; associate or disassociate an image with a node in a tier node slot; allocate, de-allocate, startup or shutdown a node; move a node to a tier; apply, remove or cycle power of a node; create a golden image; create or delete an image instance; and delete an activity, node or tier.

Report generator 302 provides an extensible mechanism for generating reports 314. Typical reports include image utilization reports that contain information with respect to the number of nodes running each software image, inventory reports detailing both the logical and physical aspects of the fabric, and system event reports showing all events that have occurred within the fabric. Report generator 302 gathers, localizes, formats and displays data into report form for presentation to the user. Report generator 302 may include one or more data gathering modules (not shown) that gather events in accordance with a schedule and update an events table to record the events. The data gathering modules may write the events in XML format.

Figure 20:
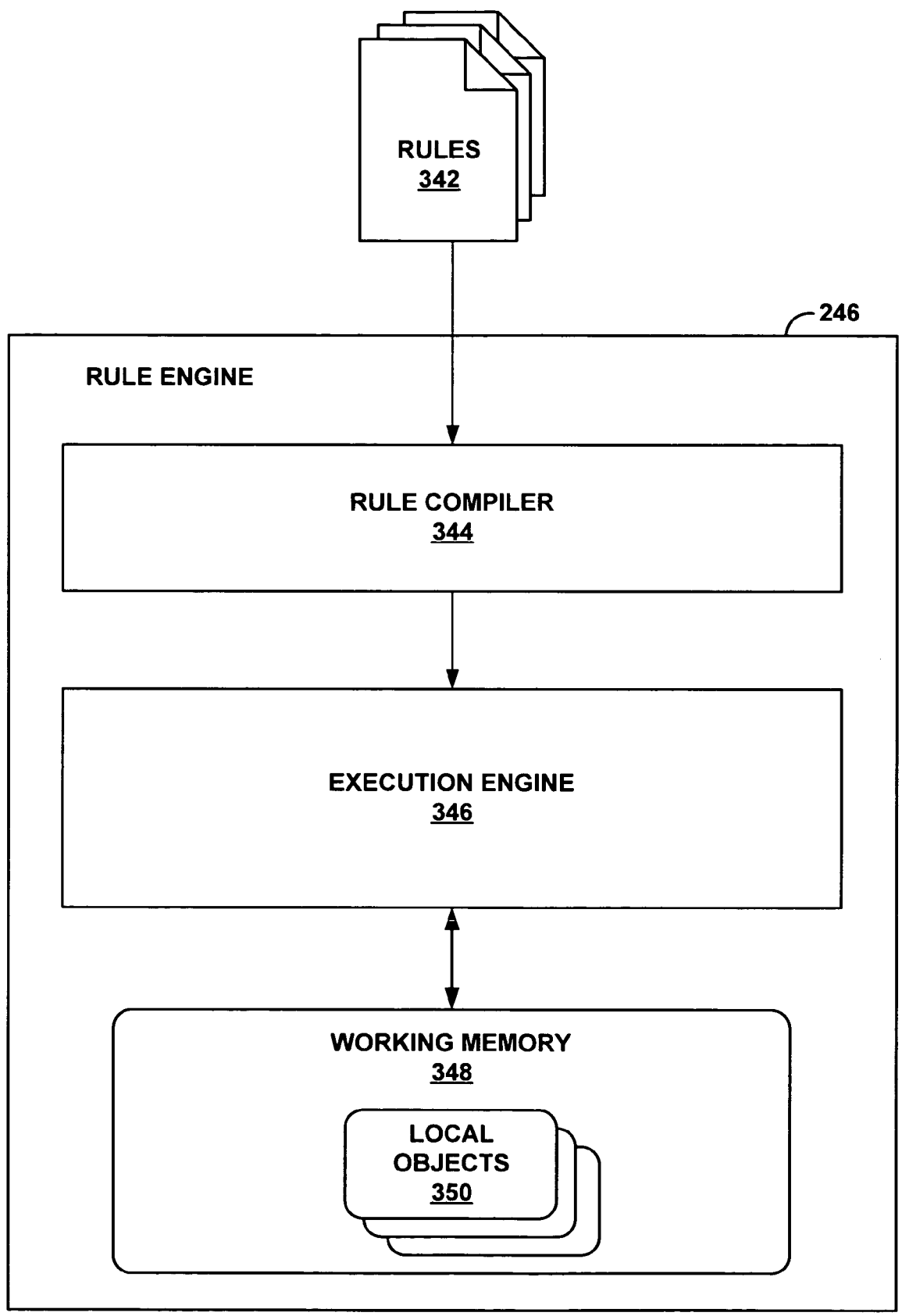
FIG. 20 is a block diagram illustrating one embodiment of a rule engine in further detail.

FIG. 20 is a block diagram illustrating one embodiment of a rule engine 246 (FIG. 17). In the illustrated embodiment, rule engine 246 includes a rule compiler 344 and an execution engine 346. Each of rules 342 represents a unit of code that conforms to a rule language and expresses a set of triggering conditions and a set of implied actions. When the conditions are met, the actions are eligible to occur. The following is one example of a configuration rule:

```
rule checkTierLoad {
    Tier t where status != "overloaded";
    LoadParameter p where app == t.app && maxload < t.load;
} -> {
    modify t {
        status: "overloaded";
    };
}
```

When translated, this example rule marks a tier as overloaded if an application is implemented by the tier and the maximum specified load for the application has been exceeded. Another example rule for outputting a notification that a tier is overloaded and automatically invoking a task within BLT 206 to add a node is:

```
rule tierOverloadNotify {
    Tier t where status == "overloaded";
} -> {
    notify "Tier: " + t + "is overloaded.";
    BLT.addNode(f);
}
```

Rule compiler 344 compiles each of rules 344 and translates match conditions of the rules into a discrimination network that avoids redundant tests during rule execution. Execution engine 346 handles rule administration, object insertion and retrieval, rule invocation and execution of rule actions. In general, execution engine 346 first matches a current set of rules 342 against a current state of working memory 348 and local objects 350. Execution engine 346 then collects all rules that match as well as the matched objects and selects a particular rule instantiation to fire. Next, execution engine 346 fires (executes) the instantiated rule and propagates any changes to working memory 348. Execution engine 346 repeats the process until no more matching rule instantiations can be found.

Firing of a rule typically produces a very small number of changes to working memory 348. This allows sophisticated rule engines to scale by retaining match state between cycles. Only the rules and rule instantiations affected by changes are updated, thereby avoiding the bulk of the matching process. One exemplary algorithm that may be used by execution engine 346 to handle the matching process includes the RETE algorithm that creates a decision tree that combines the patterns in all the rules and is intended to improve the speed of forward-chained rule system by limiting the effort required to re-compute a conflict set after a rule is fired. One example of a RETE algorithm is described in Forgy, C. L.: 1982, 'RETE: a fast algorithm for the many pattern/many object pattern match problem', Artificial Intelligence 19, 1737, hereby incorporated by reference. Other alternatives include the TREAT algorithms, and LEAPS algorithm, as described by Miranker, D. P.: 'TREAT: A New and Efficient Match Algorithm for AI Production Systems'. ISBN 0934613710 Daniel P. Miranker, David A. Brant, Bernie Lofaso, David Gadbois: On the Performance of Lazy Matching in Production Systems. AAAI 1990: 685692, each of which is hereby incorporated by reference.

Figure 21:
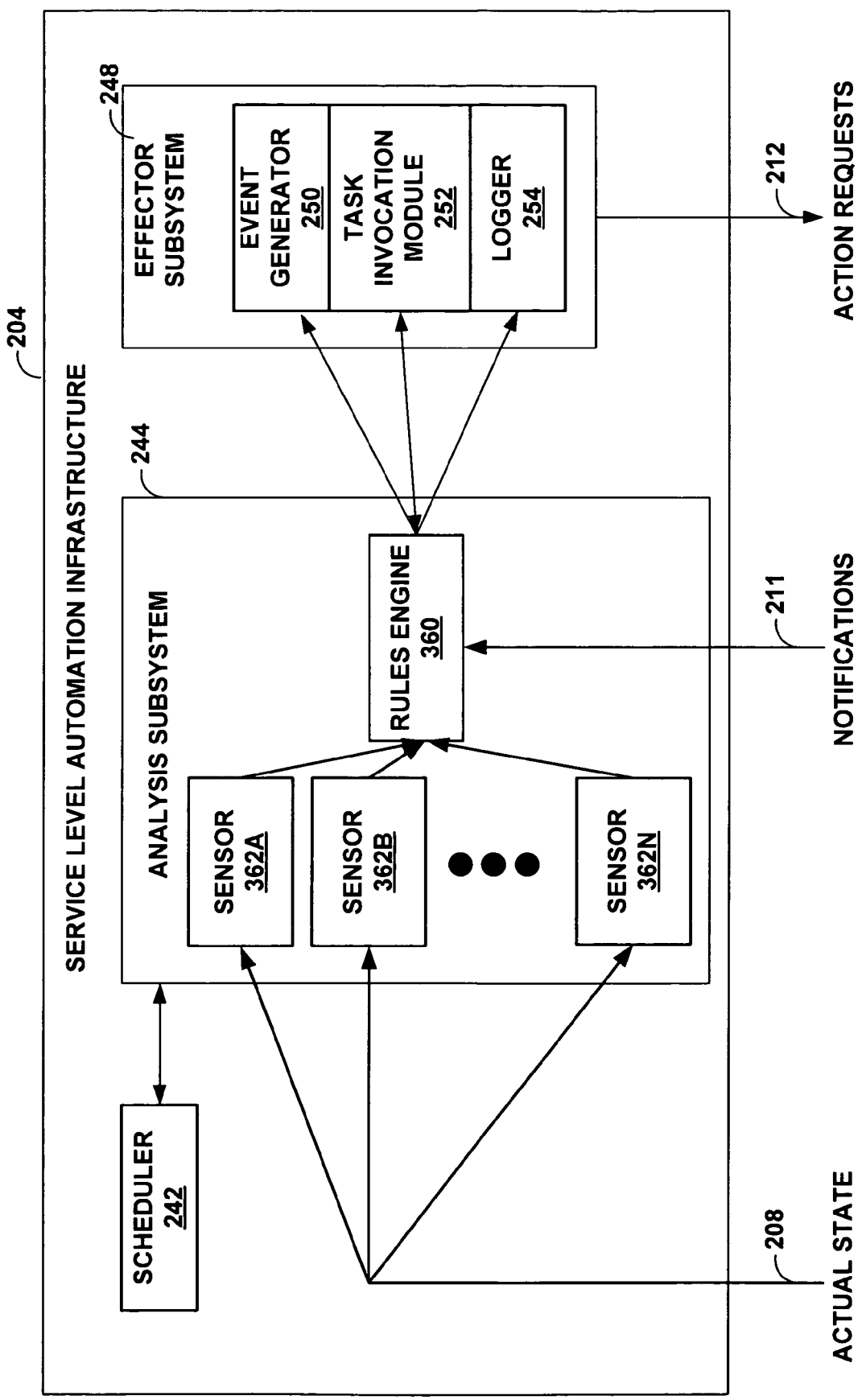
FIG. 21 is a block diagram illustrating another example embodiment of the SLAI.

FIG. 21 is a block diagram illustrating an alternative embodiment of SLAI 204 (FIG. 17). In FIG. 21, rules engines 246 has been replaced with a single rules engine 360 and the separate sensor subsystem 240 has been removed. In this embodiment, the functionality of sensor subsystem 240 has been folded into analysis subsystem 244 by defining sensors in terms of rules.

As described earlier, a sensor is a software module that listens to a stream of monitoring data produced by monitoring subsystem 202. When the sensor detects a certain pattern of data, the sensor takes some action. However, it is not always necessary for the sensor to be listening and responding. Rather there may be only specific times when SLAI 204 needs the information provided by the sensor.

As described in further detail below, in this embodiment SLAI 204 defines sensors be defined in terms of one or more rules. When certain preconditions are true, the sensor becomes active, i.e., enters a monitoring state. Thereafter, the sensor performs some action (i.e., "fires") whenever the sensor detects a certain pattern of data in the stream of information describing the actual state of the system 208. In particular, the sensor action changes or updates a model in working memory 348, and fires when one or more rules are satisfied. This model in working memory 348 reflects the actual state of the distributed computing system. Moreover, a sensor may be defined as a set of one or more forward-chaining rules linked to form an overall triggering sequence.

Whenever the preconditions defining the sensor are not true, the sensor becomes inactive, i.e., ceases monitoring the data.

For example, if administrator 20 wished to define a sensor that automatically updates a variable in working memory 348 when the status of a node changes for a particular tier node slot. Moreover, assume administrator 20 is only interested in this change when the node deployed to the slot is currently in the NODE_ENABLED or ONLINE states and the target state of the node is ONLINE, or when the target state is OFFLINE and the current state is ONLINE, or when the node has not been interacted with. In this case, administrator 20 could write a rule describing this sensor using the following pseudocode:

```
sensor nodeStateSensor {
    NodeGoal goal;
    NodeConnectorIVO connector where .uid == goal#connectorUid;
    test (
            (goal#targetState > NODE_ENABLED &&
                goal#state >= NODE_ENABLED) ||
            (goal#targetState < NODE_STARTED &&
                goal#state > NODE_ENABLED) ||
            goal#hasInteracted == false
    );
} --> {
    update connector#state when "NodeOnlineStatus" changed;
}
```

This exemplary rule first defines a sensor called "nodeStateSensor." Second, the code describes the objects to which this sensor applies. In this case, a "NodeConnectorIVO" object is a particular tier node slot and a "NodeGoal" is a business goal defined by BLT 206. Thus, this rule specifies that the defined sensor applies to the particular tier node slot having unique identifier ("Uid") matching the unique identifier of a "NodeConnectorIVO" object. Third, the rule describes three alternative conditions in the "test" portion. Last, the rule contains the action section indicated by the portion after the arrow. In this case, the action specifies updating the state property of the connector in working memory 348 whenever the online status of the connector changes. The sensor continues to update the online status of the connector so long as the preconditions of the "test" portion are true.

Rule compiler 344 (FIG. 20) compiles the forward-chaining sensor-defining rules along with the configuration rules. As a result of compilation, analysis subsystem 244 generates a series of sensors 362 that monitor incoming actual state data 208. Furthermore, the compilation integrates the rules and the match conditions of the sensor-defining rules into the discrimination network. As before, execution engine 346 handles rule administration, object insertion and retrieval, rule invocation and execution of rule actions. Similarly, execution engine 346 matches rules against working memory and local objects. In this manner, sensor-defining rules may be created and acted upon by execution engine 346 as any other forward-chaining rule.

FIG. 22 is a screen illustration of an exemplary user interface 370 for creating and editing sensor-defining rules. System administrator 20 may use a text editor, such as Emacs, to create and maintain the rules. Administrator 20 may configure the text editor to format sensor rules with color and indentation. In one embodiment, the text editor saves the rules as a text file. Rule compiler 344 parses the text file and generates a discrimination network. In the example of FIG. 22, user interface 370 presents three sensor-defining rules: "nodeStateSensor" 372, "applicationParameterSensor" 374, and "loadAverageSensor" 376.

In this manner, administrator 20 may utilize sensor-defining rules to more easily govern the behavior of control node 12 and the distributed computing system. Administrator 20 need not to separately create and configure sensors as the sensor definition may be integrated within the forward-chaining rules engine that provides overall autonomic control. In addition, administrator 20 can use the same programming constructions to describe sensors and substantive rules.

Various embodiments of the invention have been described. These and other embodiments are within the scope of the following claims.

The invention claimed is:

1. A distributed computing system comprising:
   a plurality of application nodes interconnected via a communications network, wherein each of the application nodes comprises one or more programmable processors; and
   a control node that comprises:
   (i) a working memory that stores a model that reflects an actual state of the distributed computing system;
   (ii) an automation subsystem having a rules engine that provides autonomic control of the application nodes in accordance with a set of one or more rules;
   (iii) a monitoring subsystem that collects status data from the application nodes and communicates the status data to the automation subsystem, wherein the status data represents an actual state for the application nodes; and
   (iv) a business logic tier that performs operations to control the application nodes and provides expected state data to the automation subsystem, wherein the expected state data represents an expected state for the application nodes,
   wherein the rules engine applies a first subset of the set of rules to update a model of the actual state of the application nodes based on the status data received from the monitoring subsystem, wherein each rule in the first subset of the set of rules defines a sensor for the automation subsystem,
   wherein the rules engine determines whether the model satisfies a condition specified in a condition portion of each rule in the first subset of the set of rules,
   wherein the rules engine activates a rule within the first subset of the set of rules when the model satisfies the condition specified in the condition portion of the rule,
   wherein the rules engine deactivates the rule when the model does not satisfy the condition specified in the condition portion of the rule,
   wherein the rules engine determines whether the status data from the monitoring subsystem includes a data pattern specified in an action portion of the rule when the rule is activated,
   wherein the rules engine ceases to determine whether the status data from the monitoring subsystem includes the data pattern specified in the action portion of the rule when the rule is deactivated,
   wherein the rule engine updates the model in accordance with an operation specified in the action portion of the rule when the rules engine determines that the status data includes the data pattern specified in the action portion of the rule,
   wherein the rules engine analyzes the model of the actual state of the application nodes analyzes the expected state data from the business logic tier, and applies a second subset of the set of rules to produce action requests to the business logic tier, wherein the action requests indicate one or more operations for the business logic tier to perform to reduce any difference between the model of the actual state of the application nodes and the expected state for the application nodes.

2. The distributed computing system of claim 1, wherein the rule engine is a forward-chaining rule engine.

3. The distributed computing system of claim 1,
   wherein the automation subsystem includes a rule compiler that compiles the rules into one or more discrimination networks; and
   wherein the rules engine uses the one or more discrimination networks to determine whether the model satisfies the conditions specified in the condition portions of each rules in the first subset of the set of rules.

4. The distributed computing system of claim 1, wherein the monitoring subsystem comprises a set of modular information collectors that collect the status data from the application nodes.

5. The distributed computing system of claim 4, wherein each of the information collectors conforms to a different communication protocol.

6. The distributed computing system of claim 4, wherein the application nodes are organized into tiers, and wherein each of the information collectors collects the status data from the application nodes of different tiers.

7. The distributed computing system of claim 4, wherein the automation subsystem registers collection requests with the monitoring subsystem, and the monitoring subsystem includes a monitoring engine that invokes the collectors in response to the collection requests.

8. The distributed computing system of claim 1, wherein the business logic tier includes a set of web services that control the application nodes.

9. The distributed computing system of claim 1, wherein the business logic tier presents interfaces by which a user defines one or more goals for the expected state of the distributed computing system.

10. The distributed computing system of claim 9, wherein the business logic tier registers the goals with the automation subsystem for achievement by the rules engine in accordance with the set of rules.

11. The distributed computing system of claim 9, wherein the automation subsystem automatically formulates dependencies between the goals.

12. The distributed computing system of claim 9, wherein the business logic tier further comprises:
    a task manager that invokes a task that controls the operation; and
    an event subsystem that tracks the progress of the task.

13. The distributed computing system of claim 9, wherein the goals include at least one of software image management goals, node allocation goals, goals for harvesting nodes, tier capacity goals, asset requirement goals and goals for gathering the status data 14. The distributed computing system of claim 1, wherein the rules are units of code that conform with a rule language.

15. The distributed computing system of claim 1, wherein the control node presents interfaces by which a user defines the rules in the set of rules.

16. The distributed computing system of claim 1, further comprising:
    a database storing data that defines a model for a hierarchical organization of the distributed computing system, wherein the model specifies a fabric having one or more domains, and wherein each domain has at least one tier that includes at least one node slot that is associated with a software image,
    wherein when the business logic tier applies the operation to the distributed computing system, the business logic tier configures one of the application nodes to execute the software image associated with the node slot.

17. The distributed computing system of claim 16, wherein each tier represents a different computing function.

18. The distributed computing system of claim 1, wherein the rules engine comprises:
    a rule compiler to generate a discrimination network based on a set of match conditions supplied by the set of rules;
    a memory to store the model of the actual state of the application nodes; and an execution engine to determine whether each rule in the set of rules matches a current state of the memory, collect all rules that match the current state of the memory, select a rule within the set of rules to fire, fire the selected rule, and propagate any changes to the memory.

19. A computer-implemented method comprising:

receiving input that defines an expected state for a distributed computing system having a plurality of application nodes interconnected via a communications network;

receiving status data from the distributed computing system regarding an actual state of the distributed computing system;

determining, with a rules engine, whether a model of the actual state of the application nodes satisfies a condition specified in a condition portion of each rule in a first subset of a set of rules;

activating a rule within the first subset of the set of rules when the model satisfies the condition specified in the condition portion of the rule;

deactivating the rule when the model does not satisfy the condition specified in the condition portion of the rule;

determining, with the rules engine, whether the status data includes a data pattern specified in an action portion of the rule when the rule is activated;

ceasing to determine, with the rules engine, whether the status data includes the data pattern specified in the action portion of the rule when the rule is deactivated;

updating the model in accordance with an operation specified in the action portion of the rule when the rules engine determines that the status data includes the data pattern specified in the action portion of the rule;

processing rules within a second subset of the set of rules to determine operations for reducing any difference between the expected state and a model of the actual state of the nodes;

applying the operations for reducing any difference between the expected state and the model to the distributed computing system to control the application nodes in accordance with the rules.

20. The method of claim 19, wherein the rules in the set of rules are forward-chaining rules;

wherein the method further comprises compiling the rules in the set of rules into one or more discrimination networks; and wherein determining whether the model satisfies conditions specified in the condition portions of the rules in the first subset of the set of rules comprises using the one or more discrimination networks to determine whether the model satisfies conditions specified in the condition portions of the rules in the first subset of the set of rules.

21. The method of claim 19, further comprising collecting the status data from the application nodes with a plurality of modular information collectors.

22. The method of claim 21, further comprising:

registering collection requests with a monitoring subsystem; and executing a monitoring engine that invokes the collectors in response to the collection requests.

23. The method of claim 19, further comprising:

presenting an interface by which a user defines the expected state as one or more goals; and wherein receiving the input that defines the expected state comprises receiving the goals.

24. The method of claim 23, further comprising:

storing data that defines a model for a hierarchical organization of the distributed computing system, wherein the model specifies a fabric having a one or more domains, and wherein each domain has at least one tier that includes at least one node slot that is associated with a software image; and wherein applying the operation comprises configuring one of the application nodes to execute the software image associated with the node slot.

25. The method of claim 19, further comprising:

presenting an interface by which a user inputs the rules in the set of rules.

* * * * *